(12) United States Patent
Vereecken et al.

(10) Patent No.: US 11,081,685 B2
(45) Date of Patent: *Aug. 3, 2021

(54) SOLID ELECTROLYTE, ELECTRODE, AND POWER STORAGE DEVICE

(71) Applicants: IMEC VZW, Leuven (BE); PANASONIC CORPORATION, Osaka (JP)

(72) Inventors: Philippe Vereecken, Liege (BE); Knut Bjarne Gandrud, Leuven (BE); Maarten Mees, Kessel-Lo (BE); Akihiko Sagara, Nara (JP); Mitsuhiro Murata, Hyogo (JP)

(73) Assignees: IMEC VZW, Leuven (BE); PANASONIC CORPORATION, Osaka (JP)

(*) Notice: Subject to any disclaimer, the term of this patent is extended or adjusted under 35 U.S.C. 154(b) by 219 days.

This patent is subject to a terminal disclaimer.

(21) Appl. No.: 16/490,490

(22) PCT Filed: Feb. 12, 2019

(86) PCT No.: PCT/JP2019/004856
§ 371 (c)(1),
(2) Date: Aug. 30, 2019

(87) PCT Pub. No.: WO2019/239631
PCT Pub. Date: Dec. 19, 2019

(65) Prior Publication Data
US 2021/0013484 A1    Jan. 14, 2021

(30) Foreign Application Priority Data
Jun. 12, 2018 (JP) .............................. JP2018-112284

(51) Int. Cl.
*H01M 4/13* (2010.01)
*H01M 4/36* (2006.01)
(Continued)

(52) U.S. Cl.
CPC ............. *H01M 4/13* (2013.01); *H01M 4/366* (2013.01); *H01M 4/621* (2013.01);
(Continued)

(58) Field of Classification Search
CPC ........... H01M 10/052; H01M 10/0525; H01M 10/0565; H01M 2004/027;
(Continued)

(56) References Cited

U.S. PATENT DOCUMENTS

2012/0021279 A1    1/2012    Le Bideau et al.
2015/0194701 A1    7/2015    Kim et al.

FOREIGN PATENT DOCUMENTS

JP    2011-113906 A    6/2011
JP    2011-119053 A    6/2011
(Continued)

OTHER PUBLICATIONS

Asay, David B. et al., "Evolution of the Adsorbed Water Layer Structure on Silicon Oxide at Room Temperature," Journal of Physical Chemistry B, vol. 109, No. 35, pp. 16760-16763, 2005.
(Continued)

*Primary Examiner* — Carlos Barcena
(74) *Attorney, Agent, or Firm* — McDermott Will & Emery LLP

(57) ABSTRACT

A solid electrolyte (10) of the present disclosure includes: a porous dielectric (11) having a plurality of pores (12) interconnected mutually; an electrolyte (13) including a metal salt and at least one selected from the group consisting of an ionic compound and a bipolar compound, the electrolyte (13) at least partially filling an interior of each of the
(Continued)

plurality of pores (12); and a surface adsorption layer (15) adsorbed on inner surfaces of the plurality of pores (12) to induce polarization. The surface adsorption layer (15) may include water adsorbed on the inner surfaces of the plurality of pores (12). The surface adsorption layer (15) may include a polyether adsorbed on the inner surfaces of the plurality of pores (12).

20 Claims, 24 Drawing Sheets

(51) Int. Cl.
  *H01M 4/62* (2006.01)
  *H01M 10/0525* (2010.01)
  *H01M 4/02* (2006.01)
(52) U.S. Cl.
  CPC .. *H01M 10/0525* (2013.01); *H01M 2004/027* (2013.01); *H01M 2004/028* (2013.01); *H01M 2300/0068* (2013.01); *H01M 2300/0082* (2013.01)

(58) Field of Classification Search
  CPC ... H01M 2004/028; H01M 2300/0068; H01M 2300/0082; H01M 2300/0094; H01M 4/13; H01M 4/366; H01M 4/62; H01M 4/621
  See application file for complete search history.

(56) References Cited

FOREIGN PATENT DOCUMENTS

| | | |
|---|---|---|
| JP | 2012-518248 A | 8/2012 |
| JP | 2015-005466 A | 1/2015 |
| JP | 2016-508279 A | 3/2016 |
| JP | 2017-208250 A | 11/2017 |

OTHER PUBLICATIONS

International Search Report issued in corresponding International Patent Application No. PCT/JP2019/004856, dated May 14, 2019.

SOLID ELECTROLYTE, ELECTRODE, AND POWER STORAGE DEVICE

CROSS-REFERENCE TO RELATED APPLICATIONS

This application is the U.S. National Phase under 35 U.S.C. § 371 of International Application No. PCT/JP2019/004856, filed on Feb. 12, 2019, which claims the benefit of Japanese Application No. 2018-112284, filed on Jun. 12, 2018, the entire contents of each are hereby incorporated by reference.

TECHNICAL FIELD

The present disclosure relates to a solid electrolyte, electrode, and power storage device.

BACKGROUND ART

All-solid-state lithium secondary batteries have recently been under development as next-generation batteries. It has been desired to improve the ionic conductivity of solid electrolytes used in power storage devices such as all-solid-state lithium secondary batteries.

Patent Literature 1 discloses a method for producing solid electrolytes by a sol-gel process using a liquid mixture containing an ionic liquid, lithium salt, and silica precursor.

CITATION LIST

Patent Literature

Patent Literature 1: JP 2012-518248 A

SUMMARY OF INVENTION

Technical Problem

The present disclosure provides a new solid electrolyte with high ionic conductivity.

Solution to Problem

The present disclosure provides a solid electrolyte including:

a porous dielectric having a plurality of pores interconnected mutually;

an electrolyte including a metal salt and at least one selected from the group consisting of an ionic compound and a bipolar compound, the electrolyte at least partially filling an interior of each of the plurality of pores; and a surface adsorption layer adsorbed on inner surfaces of the plurality of pores to induce polarization.

Advantageous Effects of Invention

The present disclosure can provide a new solid electrolyte with high ionic conductivity.

BRIEF DESCRIPTION OF DRAWINGS

FIG. 14 is a graph showing a change over time in ionic conductivity of a solid electrolyte of Sample 1a.

FIG. 18 is a graph showing changes over time in ionic conductivity of the solid electrolytes of Sample 1a and Sample 2a.

FIG. 19 schematically shows a configuration of a surface adsorption layer of the solid electrolyte of Sample 2a.

Figure 1A:
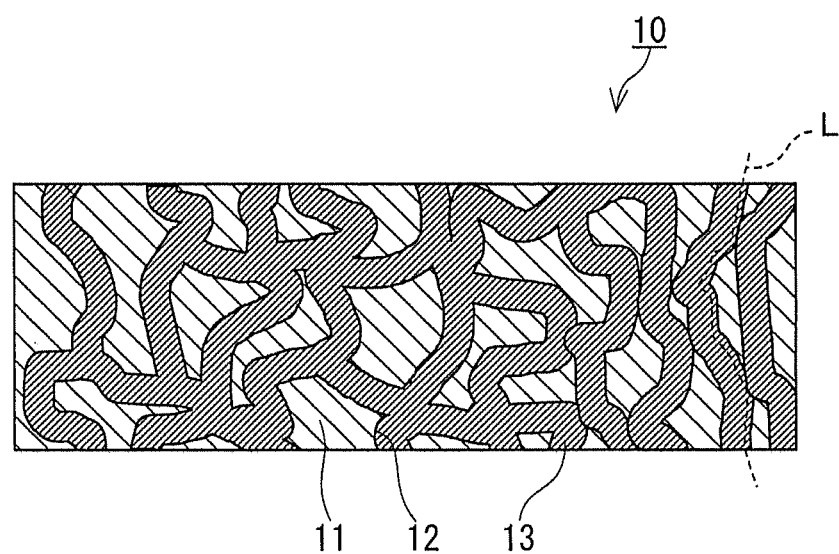
FIG. 1A schematically shows an example of a cross-sectional structure of a solid electrolyte according to a first embodiment.

DESCRIPTION OF EMBODIMENTS (Summary of One Aspect According to the Present Disclosure)

A solid electrolyte according to a first embodiment of the present disclosure includes:

a porous dielectric having a plurality of pores interconnected mutually;

an electrolyte including a metal salt and at least one selected from the group consisting of an ionic compound and a bipolar compound, the electrolyte at least partially filling an interior of each of the plurality of pores; and a surface adsorption layer adsorbed on inner surfaces of the plurality of pores to induce polarization.

Because of the presence of the porous dielectric and surface adsorption layer, the ionic conductance in the electrolyte is improved and the ionic conductivity of the solid electrolyte is increased.

According to a second aspect of the present disclosure, for example, in the solid electrolyte according to the first aspect, the electrolyte may include a polarization layer adsorbed on an inner surface of the surface adsorption layer, the polarization layer may include a first ion layer, a second ion layer, and a third ion layer, the first ion layer may be a layer including a plurality of first ions bonded to the surface adsorption layer, the plurality of first ions each may have a first polarity, the second ion layer may be a layer including a plurality of second ions bonded to the plurality of first ions, the plurality of second ions each may have a second polarity being a polarity opposite to the first polarity, the third ion layer may be a layer including a plurality of third ions bonded to the plurality of second ions, and the plurality of third ions each may have the first polarity. The polarization layer improves the ionic conductance.

According to a third aspect of the present disclosure, for example, in the solid electrolyte according to the second aspect, the plurality of first ions each may be an anion derived from the ionic compound or the metal salt, the plurality of second ions each may be a cation derived from the ionic compound, and the plurality of third ions each may be an anion derived from the ionic compound or the metal salt. The polarization layer can be composed of the cation and anion derived from the ionic compound or metal salt.

According to a fourth aspect of the present disclosure, for example, in the solid electrolyte according to the second or third aspect, the electrolyte may further include a bulk layer located farther from the inner surface of the pore than the polarization layer. The bulk layer also contributes to ion conduction.

According to a fifth aspect of the present disclosure, for example, in the solid electrolyte according to any one of the second to fourth aspects, the surface adsorption layer may include water adsorbed on the inner surfaces of the plurality of pores. Water can effectively impart ability to induce polarization of the polarization layer to the surface adsorption layer.

According to a sixth aspect of the present disclosure, for example, in the solid electrolyte according to the fifth aspect, the water may form 1 or more and 4 or less monolayers. This allows water to stably exist in the inner surface of the pore of the porous dielectric.

According to a seventh aspect of the present disclosure, for example, in the solid electrolyte according to any one of the second to sixth aspects, the surface adsorption layer may include a polyether adsorbed on the inner surfaces of the plurality of pores. The polyether also can effectively impart the ability to induce polarization of the polarization layer to the surface adsorption layer.

According to an eighth aspect of the present disclosure, for example, in the solid electrolyte according to the seventh aspect, the polyether may include polyethylene glycol. Polyethylene glycol can effectively form the surface adsorption layer.

According to a ninth aspect of the present disclosure, for example, in the solid electrolyte according to the eighth aspect, the polyethylene glycol may have a number average molecular weight of 4000 or more and 100000 or less. When the number average molecular weight of polyethylene glycol is within this range, the surface adsorption layer can be formed effectively.

According to a tenth aspect of the present disclosure, for example, in the solid electrolyte according to the eighth aspect, the polyethylene glycol may have a viscosity average molecular weight of 100000 or more and 600000 or less. When the viscosity average molecular weight of polyethylene glycol is within this range, the surface adsorption layer can be formed effectively.

According to an eleventh aspect of the present disclosure, for example, in the solid electrolyte according to any one of the first to tenth aspects, the metal salt may be a lithium salt. In the case where the electrolyte includes the lithium salt, the solid electrolyte of the present disclosure is applicable to lithium-ion secondary batteries.

According to a twelfth aspect of the present disclosure, for example, in the solid electrolyte according to the eleventh aspect, the lithium salt may include lithium bis(trifluoromethanesulfonyl)imide. With the use of Li-TFSI, the solid electrolyte having high ionic conductivity can be obtained.

According to a thirteenth aspect of the present disclosure, for example, in the solid electrolyte according to any one of the first to twelfth aspects, the ionic compound may be an ionic liquid. Having properties such as flame retardancy, poor volatility, and high ionic conductance, the ionic liquid is suitable as the material of the solid electrolyte.

According to a fourteenth aspect of the present disclosure, for example, in the solid electrolyte according to the thirteenth aspect, the ionic liquid may include a bis(trifluoromethanesulfonyl)imide anion. Among anions to be contained in the ionic liquid, the bis(trifluoromethanesulfonyl)imide anion is suitable for the solid electrolyte of the present disclosure.

According to a fifteenth aspect of the present disclosure, for example, in the solid electrolyte according to the fourteenth aspect, the ionic liquid may include at least one selected from the group consisting of 1-butyl-1-methylpyrrolidinium bis(trifluoromethanesulfonyl)imide and triethylsulfonium bis(trifluoromethanesulfonyl)imide. These ionic liquids are suitable for the solid electrolyte of the present disclosure.

According to a sixteenth aspect of the present disclosure, for example, in the solid electrolyte according to any one of the first to fifteenth aspects, the porous dielectric may be porous silica. Porous silica is chemically stable and thus suitable as a matrix material of the solid electrolyte.

According to a seventeenth aspect of the present disclosure, for example, in the solid electrolyte according to any one of the first to sixteenth aspects, the porous dielectric may form a single layer, and an outer boundary of the solid electrolyte may be defined by the porous dielectric. Such a configuration allows easy handling of the solid electrolyte and easy application of the solid electrolyte to, for example, power storage devices.

An electrode according to an eighteenth aspect of the present disclosure includes:

the solid electrolyte according to any one of the first to seventeenth aspects; and an electrode active material.

According to the eighteenth aspect, an electrode having excellent electrical characteristics can be obtained.

In a nineteenth aspect of the present disclosure, for example, the electrode according to the eighteenth aspect may further include at least one selected from a conductive agent and a binder. The conductive agent contributes to a sufficient reduction in the internal resistance of the electrode. The binder serves to fix particles of the electrode active material to each other. When the particles of the electrode active material are fixed to each other, occurrence of a gap due to expansion and shrinkage of the particles of the electrode active material is reduced.

This reduces a decrease in the discharged capacity of a battery including the electrode.

A power storage device according to a twentieth aspect of the present disclosure includes:

a positive electrode; and a negative electrode; and the solid electrolyte according to any one of the first to seventeenth aspects.

According to the twentieth aspect, a power storage device having excellent electrical characteristics can be obtained.

A power storage device according to a twenty-first aspect of the present disclosure includes:

a positive electrode; and a negative electrode, wherein at least one selected from the positive electrode and the negative electrode is the electrode according to the eighteenth aspect or nineteenth aspect.

According to the twenty-first aspect, a power storage device having excellent electrical characteristics can be obtained.

Hereinafter, embodiments of the present invention will be described with reference to the drawings. The present invention is not limited to the following embodiments.

First Embodiment

FIG. 1A schematically shows an example of a cross-sectional structure of a solid electrolyte 10 according to a first embodiment. The solid electrolyte 10 includes a porous dielectric 11 and an electrolyte 13. The porous dielectric 11 has a plurality of pores 12 interconnected mutually. The plurality of pores 12 are what are called continuous pores. Incidentally, the plurality of pores 12 may include an isolated pore. The electrolyte 13 covers the inner surfaces of these pores 12. The electrolyte 13 may at least partially fill the interior of each of the plurality of pores 12, or may completely fill the interior of each of the plurality of pores 12.

The term "solid" as used herein refers to being in solid state as a whole system at room temperature. Partial inclusion of a liquid is not excluded. Gels, for example, are "solid".

The porous dielectric 11 is, for example, porous silica. The porous silica is, for example, mesoporous silica. The porous silica is chemically stable and thus suitable as a matrix material of the solid electrolyte 10. The surface of the porous silica is hydrophilic. Thus, for example, when a surface adsorption layer 15 described later includes water, a water molecule can be stably adsorbed onto the porous silica. Other examples of the porous dielectric 11 include porous alumina ($Al_2O_3$), porous titania ($TiO_2$), porous zirconia ($ZrO_2$), and their mixtures.

The porous dielectric 11 may have a porosity in the range of 25% or more and 90% or less. The diameter of each pore 12 of the porous dielectric 11 is, for example, in the range of 2 nm or more and 80 nm or less. The diameters of the pores 12 may be measured, for example, by the following method. The solid electrolyte 10 is immersed in an organic solvent to dissolve the electrolyte 13 in the organic solvent. The electrolyte 13 is then removed by supercritical drying, followed by measurement of the specific surface area of the porous dielectric 11 by the BET method. From the result of the measurement, the porosity and the respective diameters of the pores 12 (micropore distribution) can be calculated. Alternatively, the porosity and the diameters of the pores 12 can be determined by preparing a thin piece of the solid electrolyte 10 by focused ion beam (FIB) and observing the thin piece of the solid electrolyte 10 with a transmission electron microscope (TEM).

In the present embodiment, the porous dielectric 11 forms a single layer. The layer of the porous dielectric 11 may be self-supporting. The outer boundary of the solid electrolyte 10 is defined by the porous dielectric 11. Such a configuration allows easy handling of the solid electrolyte 10 and easy application of the solid electrolyte 10 to, for example, power storage devices.

The electrolyte 13 includes, for example, an ionic compound. The ionic compound can be an ionic liquid. Having properties such as flame retardancy, poor volatility, and high ionic conductance, the ionic liquid is suitable as the material of the solid electrolyte 10. Ions in the ionic liquid can move relatively freely. Therefore, for example, when the electrolyte 13 includes a polarization layer 130 described later, ions in the polarization layer 130 can be oriented efficiently.

Examples of a cation contained in the ionic liquid include a 1-butyl-1-methylpyrrolidinium cation ($BMP^+$), 1-butyl-3-methylimidazolium cation ($BMI^+$), 1-ethyl-3-methylimidazolium cation ($EMI^+$), 1,2-dimethyl-3-propylimidazolium cation ($DMPI^+$), 1,2-diethyl-3,5-dimethylimidazolium cation ($DEDMI^+$), trimethyl-n-hexylammonium cation ($TMHA^+$), n-butyl-n-methylpyrrolidinium cation ($PYR14^+$), n-methyl-n-pentylpyrrolidinium cation ($PYR15^+$), n-methyl-n-propylpiperidinium cation ($PIP^+$), and triethylsulfonium cation ($TES^+$).

Among the cations to be contained in the ionic liquid, the 1-butyl-1-methylpyrrolidinium cation ($BMP^+$) and triethylsulfonium cation ($TES^+$) are suitable for the solid electrolyte 10 of the present disclosure. In the case where, for example, the $BMP^+$ forms a cation layer described later, the $BMP^+$ can be oriented so that the longitudinal direction of the $BMP^+$ (namely, a direction in which a n-butyl group of the $BMP^+$ extends) will be along the inner surface of the surface adsorption layer 15. Therefore, the thickness of the polarization layer 130 with respect to the number of ion layers forming the polarization layer 130 can be reduced, and the surface adsorption layer 15 can efficiently induce polarization of the polarization layer 130. The thickness of the polarization layer 130 can be reduced and the surface adsorption layer 15 can efficiently induce polarization of the polarization layer 130 also in the case where, for example, the $TES^+$ forms the cation layer described later, because the $TES^+$ is smaller than other cations.

Examples of an anion to be contained in the ionic liquid include a bis(trifluoromethanesulfonyl)imide anion ($TFSI^-$), bis(fluorosulfonyl)imide anion (FSI$^-$), bis(pentafluoroethanesulfonyl)imide anion (BETI$^-$), triflate anion (OTf$^-$), dicyanamide anion (DCA$^-$), dimethyl phosphate anion (DMP$^-$), diethyl phosphate anion (DEP$^-$), dibutyl phosphate anion (DBP$^-$), 2,2,2-trifluoro-n-(trifluoromethanesulfonyl) acetimide anion (TSAC$^-$), perchlorate anion (ClO$_4^-$), perfluoroalkyl fluorophosphate anion (FAP$^-$), tetrafluoroborate anion (BF$_4^-$), and hexafluorophosphate anion (PF$_6^-$).

Among the anions to be contained in the ionic liquid, the bis(trifluoromethanesulfonyl)imide anion (TFSI$^-$) is suitable for the solid electrolyte 10 of the present disclosure. In the case where, for example, the TFSI$^-$ forms an anion layer described later, the TFSI$^-$ is likely to be oriented regularly because the TFSI$^-$ is rotationally symmetric.

The ionic liquid can be composed of a combination of any of the above cations and any of the above anions. At least one selected from the group consisting of 1-butyl-1-methylpyrrolidinium bis(trifluoromethanesulfonyl)imide and triethylsulfonium bis(trifluoromethanesulfonyl)imide can be used as the ionic liquid. These ionic liquids are suitable for the solid electrolyte 10 of the present disclosure.

The electrolyte 13 further includes a metal salt. The metal salt dissolves in the ionic compound and forms the electrolyte 13 along with the ionic compound. For example, an ion of the metal salt can function as a carrier. Examples of a cation of the metal salt include Li$^+$, Na$^+$, K$^+$, Ca$^{2+}$, Mg$^{2+}$, Cu$^{2+}$, Al$^{3+}$, Co$^{2+}$, and Ni$^{2+}$.

The metal salt may be a lithium salt. In the case where the electrolyte 13 includes the lithium salt, a lithium ion can function as a carrier, and thus the solid electrolyte 10 of the present disclosure is applicable to lithium-ion secondary batteries.

Examples of the lithium salt include lithium perchlorate (LiClO$_4$), lithium borofluoride (LiBF$_4$), lithium hexafluorophosphate (LiPF$_6$), lithium bis(fluorosulfonyl)imide (Li-FSI), lithium bis(trifluoromethanesulfonyl)imide (Li-TFSI), lithium bis(pentafluoroethanesulfonyl)imide (Li-BETI), and trifluoromethanesulfonate (Li-OTf). One lithium salt or two or more lithium salts selected from these lithium salts can be used. With the use of Li-TFSI as the lithium salt, the solid electrolyte 10 having high ionic conductivity can be obtained. In the case where, for example, the TFSI$^-$ forms the anion layer described later, the TFSI$^-$ is likely to be oriented regularly because the TFSI$^-$ is rotationally symmetric.

The molar ratio of the ionic compound to the porous dielectric 11 is, for example, more than 0.25 and less than 3.5. This makes it possible to maintain the solid electrolyte 10 in solid state and improve the ionic conductivity. The molar ratio at which the maximum ionic conductivity is reached depends on the compositions of the porous dielectric 11 and ionic compound. An optimal molar ratio varies depending on the compositions of the porous dielectric 11 and ionic compound. The optimal molar ratio can be confirmed by producing a plurality of solid electrolytes having different molar ratios and evaluating the ionic conductivity thereof.

The solid electrolyte 10 exhibits high ionic conductivity even in a low-humidity environment. After stored, for example, in an environment at room temperature and at a low humidity of 0.0005% RH for a sufficient period of time, the solid electrolyte 10 exhibits an ionic conductivity of 0.8 mS/cm or more. The sufficient period of time is, for example, 8 days.

Figure 1B:
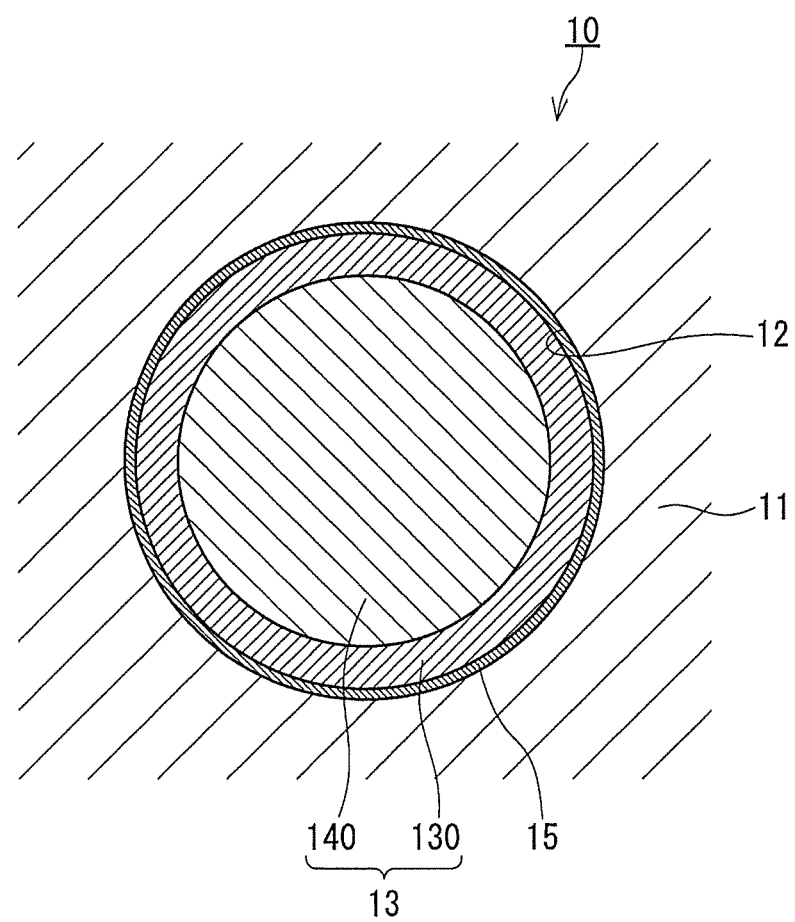
FIG. 1B schematically shows a cross-section of a pore of a porous dielectric.

FIG. 1B schematically shows an example of a cross-section of the pore 12 of the porous dielectric 11. The electrolyte 13 includes the polarization layer 130. The polarization layer 130 is a layer adsorbed on the inner surface of the surface adsorption layer 15. The polarization layer 130 may be a continuous film continuously formed along a direction in which the pore 12 extends. In the polarization layer 130, the ions contained in the electrolyte 13 are oriented regularly. The polarization layers 130 respectively provided on the inner surfaces of the plurality of pores 12 may be mutually interconnected to form a three-dimensional network. As indicated by a dotted line L in FIG. 1A, a conduction path through which a metal ion moves is formed near the inner surface of the porous dielectric 11. Specifically, a conduction path through which a metal ion moves is formed on the inner surface of the polarization layer 130.

As shown in FIG. 1B, the electrolyte 13 may include a bulk layer 140. The bulk layer 140 has contact with the inner surface of the polarization layer 130. The bulk layer 140 is located farther from the inner surface of the pore 12 than the polarization layer 130. In other words, the bulk layer 140 is located in the central portion of the pore 12. The bulk layer 140 is surrounded by the polarization layer 130. The bulk layer 140 is a layer in which the ions derived from the ionic compound and metal salt are oriented irregularly. In the bulk layer 140, the ions may have flowability. The bulk layer 140 also contributes to metal ion conduction.

As shown in FIG. 1B, the solid electrolyte 10 further includes the surface adsorption layer 15. The surface adsorption layer 15 is located between the inner surface of the pore 12 and electrolyte 13. The surface adsorption layer 15 is a layer adsorbed on the inner surfaces of the plurality of pores 12 to induce polarization. Because of the presence of the surface adsorption layer 15, the ionic conductance in the electrolyte 13 is improved and the ionic conductivity of the solid electrolyte 10 is increased.

The surface adsorption layer 15 includes, for example, at least one selected from the group consisting of water adsorbed on the inner surfaces of the plurality of pores 12 and a polyether adsorbed on the inner surfaces of the plurality of pores 12. Water can effectively impart the ability to induce polarization of the polarization layer 130 to the surface adsorption layer 15. The polyether also can effectively impart the ability to induce polarization of the polarization layer 130 to the surface adsorption layer 15.

Water may form 1 or more and 4 or less monolayers. The monolayer has an ice-like structure and has immobility. Therefore, the surface adsorption layer 15 can stably maintain the structure thereof even when, for example, a high voltage is applied to the solid electrolyte.

When the surface adsorption layer 15 includes both water and the polyether, the surface adsorption layer 15 may have a multilayer structure composed of a water layer and polyether layer, or may have a structure in which water and the polyether exist together.

Examples of the polyether include polyethylene glycol, polypropylene glycol, and polytetramethylene glycol. Among the polyethers, polyethylene glycol is suitable for the solid electrolyte 10 of the present disclosure. Polyethylene glycol can effectively form the surface adsorption layer 15. A polyether having a structure in which ethylene glycol is polymerized is herein referred to as "polyethylene glycol" regardless of the molecular weight thereof. The term "polyethylene glycol" as used herein even includes high-molecular-weight polyethylene glycol called polyethylene oxide.

The surface adsorption layer 15 does not necessarily cover the entire inner surface of the pore 12. The inner surface of the pore 12 may include a portion not covered by the surface adsorption layer 15. The polarization layer 130 does not necessarily cover the entire inner surface of the surface adsorption layer 15. The inner surface of the surface adsorption layer 15 may include a portion not covered by the polarization layer 130.

Figure 2:
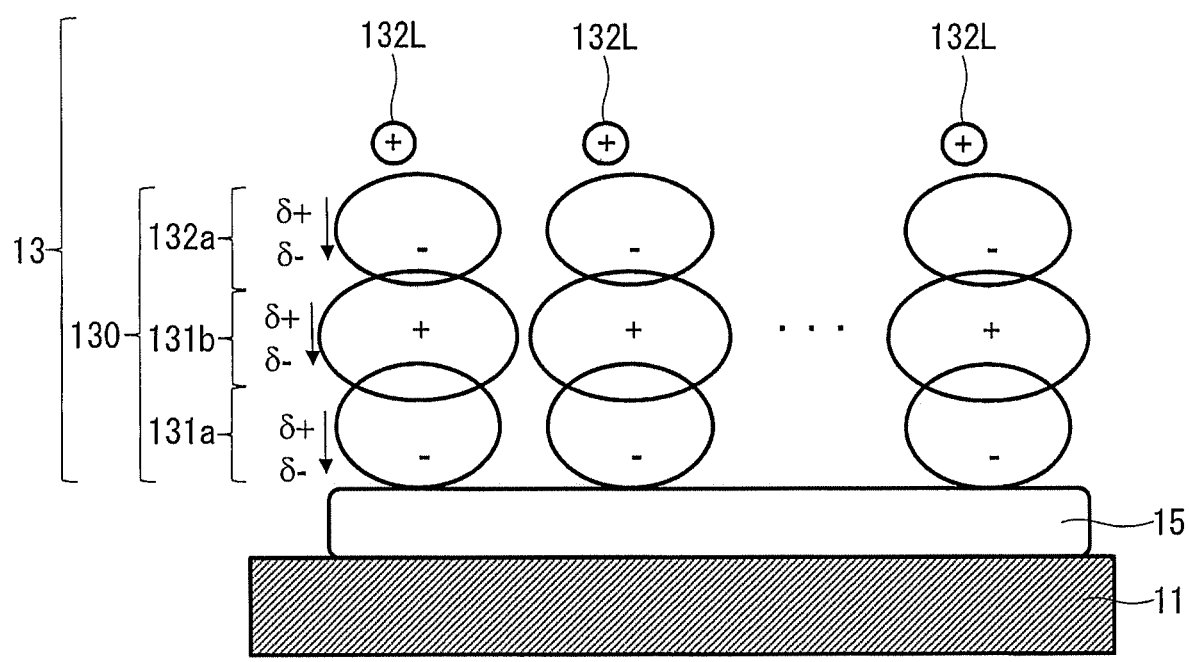
FIG. 2 schematically shows an example of a structure of a polarization layer.

FIG. 2 schematically shows an example of the structure of the polarization layer 130 in the vicinity of the inner surface of the pore 12 of the porous dielectric 11. A bis(trifluoromethansulfonyl)imide anion may be described herein as "TFSI⁻ ion". A 1-buthyl-1-methylpyrrolidinium cation may be described as "BMP⁺ ion".

In the example shown in FIG. 2, the surface adsorption layer 15 is formed on the inner surface of the pore 12. The surface adsorption layer 15 is bonded to the porous dielectric 11. The polarization layer 130 is formed on the inner surface of the surface adsorption layer 15. The polarization layer 130 includes a first ion layer 131a, second ion layer 131b, and third ion layer 132a. The first ion layer 131a, second ion layer 131b, and third ion layer 132a are arranged on the surface adsorption layer 15 in this order. There is a metal ion 132L over the polarization layer 130. The polarization layer 130 improves the conductance of the metal ion 132L.

The first ion layer 131a is a layer including a plurality of first ions bonded to the surface adsorption layer 15. The plurality of first ions each have a first polarity. In the example shown in FIG. 2, the first ion layer 131a is composed of the plurality of TFSI⁻ ions. These TFSI⁻ ions are bonded to the surface adsorption layer 15. The TFSI⁻ ion is the first ion, and a negative polarity is the first polarity.

The second ion layer 131b is a layer including a plurality of second ions bonded to the plurality of first ions. The plurality of second ions each have a second polarity being a polarity opposite to the first polarity. In the example shown in FIG. 2, the second ion layer 131b is composed of the plurality of BMP⁺ ions. These BMP⁺ ions are bonded to the plurality of TFSI⁻ ions of the first ion layer 131a, respectively. The BMP⁺ ion is the second ion, and a positive polarity is the second polarity.

The third ion layer 132a is a layer including a plurality of third ions bonded to the plurality of second ions. The plurality of third ions each have the first polarity. In the example shown in FIG. 2, the third ion layer 132a is composed of, for example, the anions (for example, TFSI⁻ ions) derived from the metal salt. These anions are bonded to the plurality of BMP⁺ ions of the second ion layer 131b. The TFSI⁻ ion is the third ion, and a negative polarity is the first polarity.

The plurality of first ions of the first ion layer 131a each can be the anion derived from the ionic compound or the metal salt. The plurality of second ions of the second ion layer 131b each can be the cation derived from the ionic compound. The plurality of third ions of the third ion layer 132a each can be the anion derived from the ionic compound or the metal salt. The form of the anion-cation bonding is, specifically, ionic bonding. The polarization layer 130 can be composed of the cation derived from the ionic compound and the anion derived from the ionic compound or metal salt.

It is inferred that in the solid electrolyte 10, the metal ion 132L such as a lithium ion can easily move over the polarization layer 130 (specifically, over the third ion layer 132a) by the following mechanism.

When the surface adsorption layer 15 is an adsorbed water layer, a surface terminal group (for example, a surface silanol group) of the porous dielectric 11 and an oxygen atom of a water molecule included in the adsorbed water layer form a hydrogen bond. Then, an atom (for example, an oxygen atom) of the first ion included in the first ion layer 131a is bonded to a hydrogen atom of the water molecule included in the adsorbed water layer.

Alternatively, when the surface adsorption layer 15 is a polyether layer, the surface terminal group (for example, the surface silanol group) of the porous dielectric 11 and an oxygen atom of a polyether molecule included in the polyether layer form a hydrogen bond. Then, the atom (for example, the oxygen atom) of the first ion included in the first ion layer 131a is bonded to a hydrogen atom of the polyether molecule included in the polyether.

At this moment, having an electrically weak positive charge, the hydrogen atom of an OH group included in the surface adsorption layer 15 draws a charge of the ion included in the first ion layer 131a. For example, when the ion included in the first ion layer 131a is the TFSI⁻ ion, a n electron of an S=O bond of the TFSI⁻ ion is drawn toward the surface adsorption layer 15 by an induced electric field since the n electron is highly delocalized. As a result, in the TFSI⁻ ion, a negative polarization charge is generated on the side closer to the surface adsorption layer 15 and a positive polarization charge is generated on the side away from the surface adsorption layer 15.

Next, when the ion included in the second ion layer 131b is the BMP⁺ ion, the BMP⁺ ion has a five-membered ring. A a electron of the five-membered ring is highly localized. When the BMP⁺ ion is bonded to the TFSI⁻ ion included in the first ion layer 131a, charge imbalance of the TFSI⁻ ion induces the a electron of the BMP⁺ ion to be drawn toward the first ion layer 131a side. This causes charge imbalance of the BMP⁺ ion. Specifically, in the BMP⁺ ion, a negative polarization charge is generated on the side closer to the surface adsorption layer 15 and a positive polarization charge is generated on the side away from the surface adsorption layer 15.

The charge imbalance of the BMP⁺ ion included in the second ion layer 131b induces charge imbalance in the third ion layer 132a. When the ion included in the third ion layer 132a is the TFSI⁻ ion, a negative polarization charge is generated on the side closer to the surface adsorption layer 15 and a positive polarization charge is generated on the side away from the surface adsorption layer 15, in the TFSI⁻ ion.

The positive polarization charge on the surface of the third ion layer 132a can weaken the force by which the third ion layer 132a draws the metal ion 132L. In other words, the Coulomb interaction between the TFSI⁻ ion of the third ion layer 132a and the metal ion 132L is weakened. This is inferred to make it easy for the metal ion 132L to move over the third ion layer 132a.

When the third ion layer 132a includes an ion same as that of the first ion layer 131a, the charge imbalance in the third ion layer 132a is increased and the force by which the third ion layer 132a draws the metal ion 132L can be effectively reduced.

The presence of the polarization layer 130 and surface adsorption layer 15 can be checked in the following manner. A molecular vibration mode is examined by Fourier-transform infrared (FT-IR) spectroscopic analysis or Raman analysis. This allows to confirm that the molecules of the surface adsorption layer 15 are bonded to the porous dielectric. The presence of the polyether of the surface adsorption layer 15 can be confirmed by checking for a peak around a wavenumber of 850 $cm^{-1}$, for example, by FT-IR measurement.

Figure 3:
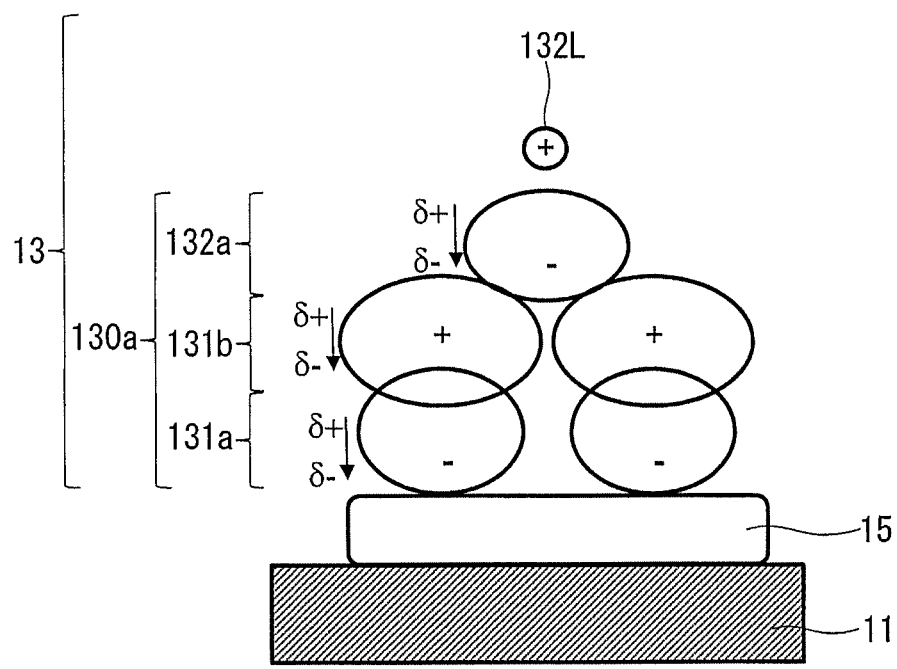
FIG. 3 schematically shows another example of the structure of the polarization layer.

FIG. 3 schematically shows another example of the structure of the polarization layer. As shown in FIG. 3, ions respectively constituting layers of a polarization layer 130a are not bonded in one-to-one correspondence. The ions respectively constituting the layers of the polarization layer 130a may be bonded to each other depending on the molar ratio between the ionic compound and metal salt.

Figure 4:
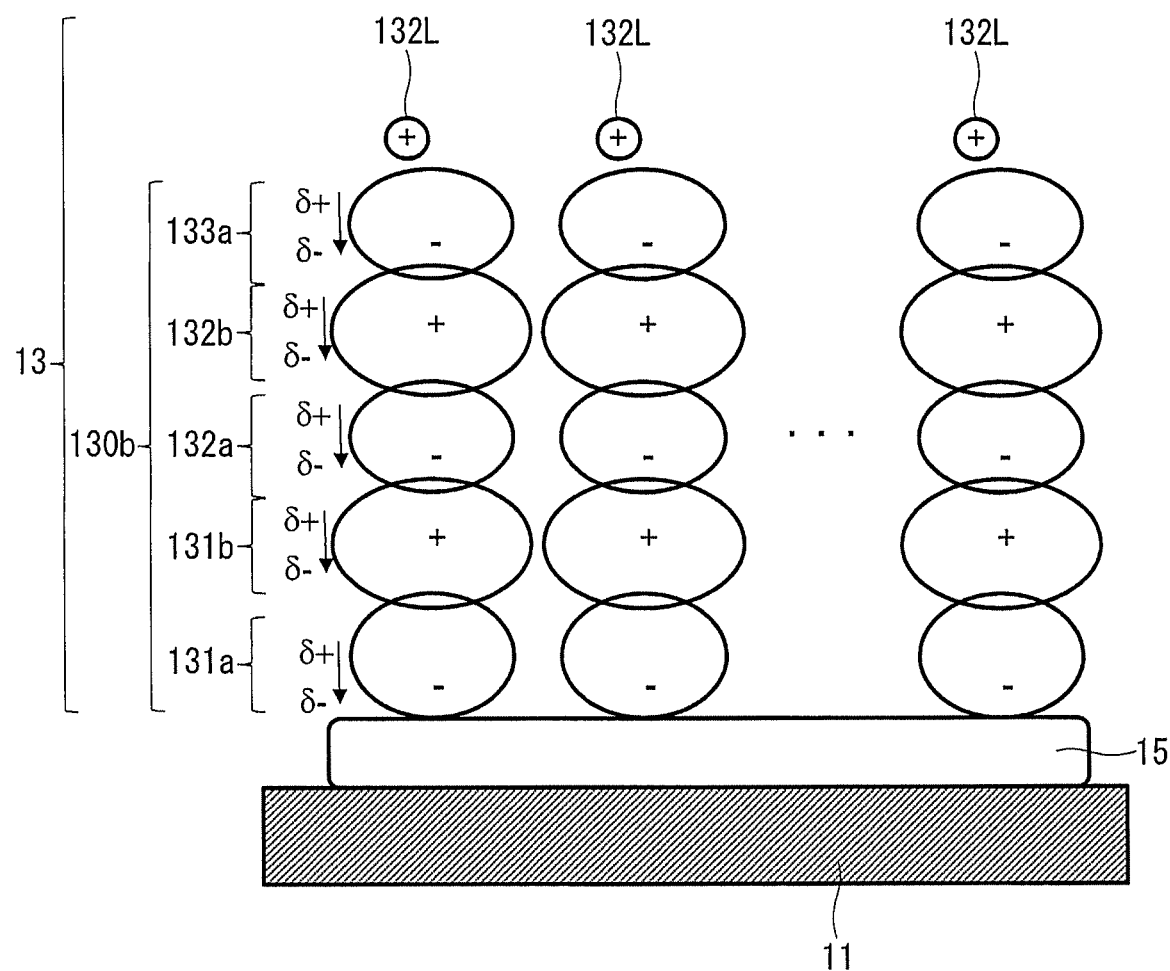
FIG. 4 schematically shows yet another example of the structure of the polarization layer.

FIG. 4 schematically shows yet another example of the structure of the polarization layer. As shown in FIG. 4, a polarization layer 130b includes the structure described with reference to FIG. 2 and further includes a fourth ion layer 132b and fifth ion layer 133a. The fourth ion layer 132b and fifth ion layer 133a are arranged in this order on the third ion layer 132a. There is the metal ion 132L over the fifth ion layer 133a.

As can be understood from FIG. 2 and FIG. 4, the number of layers included in the polarization layer is not particularly limited. The polarization layer may include a plurality of anion layers. The anions in the anion layers may be of the same type or may be of different types. The polarization layer may include a plurality of cation layers. The cations in the cation layers may be of the same type or may be of different types.

In the examples shown in FIG. 2, FIG. 3, and FIG. 4, the first ion layer 131a is an anion layer, the second ion layer 131b is a cation layer, and the third ion layer 132a is an anion layer. However, the anion and cation layers may be interchanged.

Figure 5:
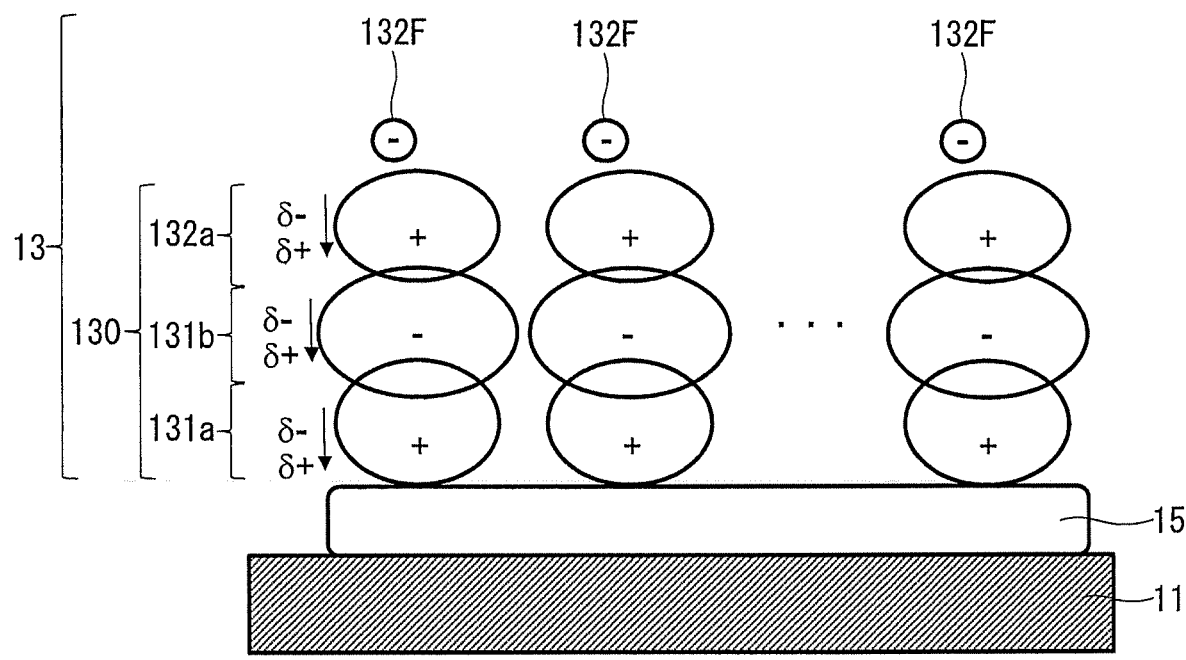
FIG. 5 schematically shows yet another example of the structure of the polarization layer.

In an example shown in FIG. 5, the first ion layer 131a is a cation layer, the second ion layer 131b is an anion layer, and the third ion layer 132a is a cation layer. The ion that moves over the surface of the polarization layer 130 is an anion 132F. Examples of the anion 132F include a fluoride ion ($F^-$ ion) and hydride ion ($H^-$ ion). In the example shown in FIG. 5, a metal fluoride or metal hydride is used as the metal salt. Examples of the metal fluoride include NaF and KF. Examples of the metal hydride include NaH, KH, and $CaH_2$. For example, when the silanol group is exposed to the inner surface of the pore 12 of the porous dielectric 11 and elimination of the hydrogen atom from the silanol group results in the presence of a "Si—$O^-$" structure, the positive charge of the cation (for example, the $BMP^+$ ion) is drawn toward this "Si—$O^-$" structure.

Next, an example of a method for producing the solid electrolyte 10 will be described with reference to FIG. 6.

Figure 6:
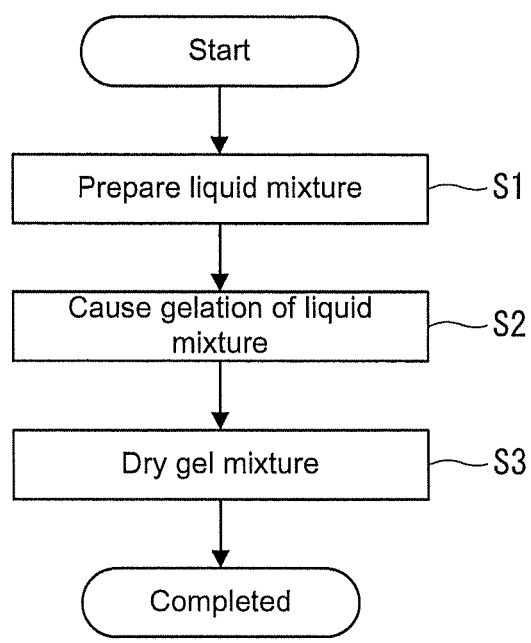
FIG. 6 is a flowchart showing an example of a method for producing the solid electrolyte according to the first embodiment.

The production method shown in FIG. 6 includes a step S1 of preparing a liquid mixture, step S2 of forming a gel mixture from the liquid mixture, and step S3 of drying the gel mixture. The solid electrolyte 10 described with reference to FIG. 1A can be produced efficiently by a sol-gel process.

In the step S1, a metal alkoxide, ionic compound, metal salt, water, and an organic solvent are mixed. For example, the metal alkoxide, ionic compound, metal salt, water, and the organic solvent are placed in a container and mixed. A liquid mixture can thus be obtained. A bipolar compound may be used instead of the ionic compound or in addition to the ionic compound.

The liquid mixture may include a polyether. The polyether can be mixed with another material.

The metal alkoxide is typically a silicon alkoxide. Examples of the silicon alkoxide include tetraethyl orthosilicate (TEOS), tetramethyl orthosilicate (TMOS), methyltrimethoxysilane (MTMS), phenyltrimethoxysilane (PTMOS), phenyltriethoxysilane (PTEOS), 3-glycidyloxypropyltrimethoxysilane (GOTMS), 3-acryloxypropyltirmethoxysilane (APTMS), 3-aminopropyltriethoxysilane (APTES), 3-aminopropyltrimethoxysilane (APTMOS), and substitution products thereof. One silicon alkoxide or two or more silicon alkoxides selected from these silicon alkoxides can be used. The boiling point of TEOS is higher than the boiling point of TMOS. Since TEOS is unlikely to volatile in the preparation of the liquid mixture, the use of TEOS as a raw material makes it possible to precisely control the amount of silica obtained at the end.

The silicon alkoxide is a precursor of the porous dielectric 11. Porous silica as the porous dielectric 11 can be obtained with the use of the silicon alkoxide.

The precursor of the porous dielectric 11 is not limited to the silicon alkoxide. Other metal alkoxides, such as aluminum tri-sec-butoxide (ATB), tetrabutyl orthotitanate (TBOT), and zirconium(IV) tetrabutoxide (ZTB), can also be used. A mixture of a plurality of metal alkoxides having different metal types may be used as the metal alkoxide.

Examples of the metal salt include the various materials described previously.

Examples of the ionic compound include the various materials described previously.

Water is required to hydrolyze the metal alkoxide, and is, for example, deionized water.

Examples of the polyether include polyethylene glycol.

The polyethylene glycol has a number average molecular weight of, for example, 200 or more and 400000 or less and may have a number average molecular weight of 4000 or more and 100000 or less. When the number average molecular weight of the polyethylene glycol is within this range, the surface adsorption layer 15 can be formed effectively. An optimal range of the viscosity average molecular weight can be confirmed by producing solid electrolytes using a plurality of polyethylene glycols having different viscosity average molecular weights and evaluating the ionic conductivity of the solid electrolytes. The number average molecular weight of the polyethylene glycol can be measured by size exclusion chromatography according to JIS K 7252-1: 2016.

The polyethylene glycol has a viscosity average molecular weight of, for example, 100000 or more and 8000000 or less and may have a viscosity average molecular weight of 100000 or more and 600000 or less. When the viscosity average molecular weight of the polyethylene glycol is within this range, the surface adsorption layer 15 can be formed effectively. An optimal range of the number average molecular weight can be confirmed by producing solid electrolytes using a plurality of polyethylene glycols having different number average molecular weights and evaluating the ionic conductivity of the solid electrolytes. The viscosity average molecular weight of the polyethylene glycol can be measured at room temperature (25° C.) by viscometry using a plastic capillary viscometer according to JIS K 7367-1: 2002.

The organic solvent is required to allow the metal alkoxide, ionic compound, metal salt, water, and the polyether to be uniformly mixed, and is, for example, an alcohol. Examples of the alcohol include methanol, ethanol, isopropanol, and 1-methoxy-2-propanol (PGME). One alcohol or two or more alcohols selected from these alcohols can be used.

The liquid mixture may contain another material.

In the step S2, a gel mixture is formed by gelation of the liquid mixture. For example, the container of the liquid mixture is sealed and stored at room temperature (for example, 25° C.) for about 3 to 23 days, during which the liquid mixture turns into a wet gel mixture. The time required for the gelation can be controlled by the amount of water, amount of the organic solvent, and storage temperature.

Specifically, the following reactions occur when TEOS is used as the metal alkoxide. First, TEOS is hydrolyzed to form silanol. Next, two silanol molecules undergo dehydration polycondensation to form a siloxane monomer. Then, a plurality of siloxane molecules undergo dehydration polycondensation to form a siloxane polymer. In this manner, the siloxane polymer forms a three-dimensional network to cause gelation of the liquid mixture.

In the step S3, the gel mixture is dried. The solid electrolyte 10 can thus be obtained. The gel mixture is dried, for example, using a vacuum dryer for 48 to 96 hours under the conditions of a pressure of 0.1 to 200 Pa and a temperature of 15 to 150° C. (ambient temperature). A pre-drying process may be carried out before the vacuum drying step to reduce occurrence of bumping and generation of air bubbles during the vacuum drying. In the pre-drying process, the gel mixture is heated, for example, using a hot plate provided on a local exhaust system for 24 to 96 hours under the conditions of atmospheric pressure and a temperature of 15 to 90° C. (surface temperature of the hot plate). Most of water and the organic solvent contained in the gel mixture can be evaporated by the pre-drying process. The pre-drying process may be carried out by leaving the gel mixture in air for 24 to 96 hours.

The solid electrolyte 10 may include the bipolar compound instead of the ionic compound or in addition to the ionic compound. The bipolar compound is a compound in which delocalized charges are distributed over a plurality of atoms spaced apart in a molecule. When the polarization layer includes the bipolar compound, the element indicated by the reference character 131a in FIG. 2 corresponds to a portion constituting the bipolar compound and including an atom having a negative charge. The element indicated by the reference character 131b in FIG. 2 corresponds to a portion constituting the bipolar compound and including an atom having a positive charge.

Examples of the bipolar compound include 1,2-dipoles, 1,3-dipoles, 1,4-dipoles, and 1,5-dipoles. The bipolar compound is, for example, at least one selected from the group consisting of diazomethane, phosphonium ylide, and carbonyl oxide. In the step S1 shown in FIG. 6, the liquid mixture can be prepared using any of these bipolar compounds.

Second Embodiment

Figure 7:
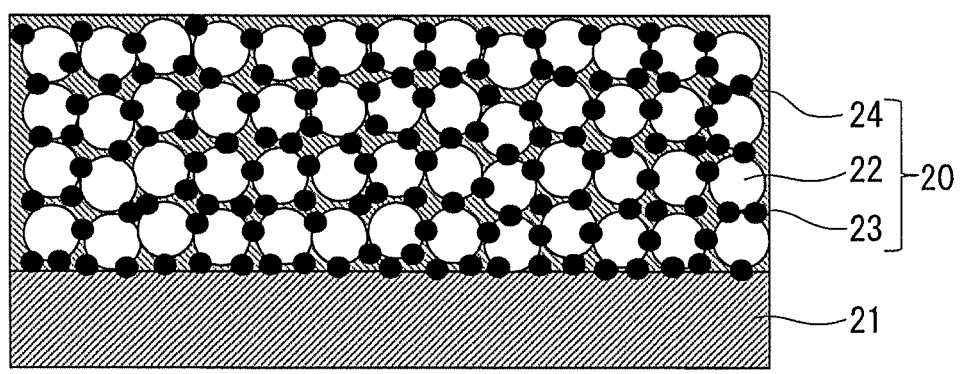
FIG. 7 schematically shows an example of a cross-sectional structure of an electrode according to a second embodiment.

FIG. 7 schematically shows an example of a cross-sectional structure of an electrode 20 according to a second embodiment. In FIG. 7, the electrode 20 is disposed on a current collector 21. The electrode 20 includes an electrode active material, conductive agent, and solid electrolyte. Specifically, the electrode 20 includes active material particles 22, conductive agent particles 23, and a solid electrolyte 24. The active material particles 22 are embedded in a matrix of the solid electrolyte 24 to be fixed. The conductive agent particles 23 are also embedded in the matrix of the solid electrolyte 24 to be fixed. The shapes of the particles 22 and 23 are not particularly limited.

The current collector 21 is made of a conductive material. Examples of the conductive material include metals, conductive oxides, conductive nitrides, conductive carbides, conductive borides, and conductive resins.

The solid electrolyte 10 described in the first embodiment can be used as the solid electrolyte 24. Since the solid electrolyte 10 of the present disclosure has high ionic conductivity, the electrode 20 having excellent electrical characteristics can be obtained by the use of the solid electrolyte 10.

According to the present embodiment, the active material particles 22 (first particles) and conductive agent particles 23 (second particles) are fixed in the matrix of the solid electrolyte 24. With such a configuration, the electrode 20 can reliably exercise the excellent electrical characteristics attributable to the high ionic conductivity of the solid electrolyte 24.

When the electrode active material used in the electrode 20 is a positive electrode active material, examples of the positive electrode active material include a lithium-containing transition metal oxide, vanadium oxide, chromium oxide, and lithium-containing transition metal sulfide. Examples of the lithium-containing transition metal oxide include $LiCoO_2$, $LiNiO_2$, $LiMnO_2$, $LiMn_2O_4$, $LiNiCoMnO_2$, $LiNiCoO_2$, $LiCoMnO_2$, $LiNiMnO_2$, $LiNiCoMnO_4$, $LiMnNiO_4$, $LiMnCoO_4$, $LiNiCoAlO_2$, $LiNiPO_4$, $LiCoPO_4$, $LiMnPO_4$, $LiFePO_4$, $Li_2NiSiO_4$, $Li_2CoSiO_4$, $Li_2MnSiO_4$, $Li_2FeSiO_4$, $LiNiBO_3$, $LiCoBO_3$, $LiMnBO_3$, and $LiFeBO_3$. Examples of the lithium-containing transition metal sulfide include $LiTiS_2$, $Li_2TiS_3$, and $Li_3NbS_4$. One positive electrode active material or two or more positive electrode active materials selected from these positive electrode active materials can be used.

When the electrode active material used in the electrode 20 is a negative electrode active material, examples of the negative electrode active material include a metal, semimetal, oxide, nitride, and carbon. Examples of the metal and semimetal include lithium, silicon, amorphous silicon, aluminum, silver, tin, antimony, and their alloys. Examples of the oxide include $Li_4Ti_5O_{12}$, $Li_2SrTi_6O_{14}$, $TiO_2$, $Nb_2O_5$, $SnO_2$, $Ta_2O_5$, $WO_2$, $WO_3$, $Fe_2O_3$, $CoO$, $MoO_2$, $SiO$, $SnBPO_6$, and their mixtures. Examples of the nitride include $LiCoN$, $Li_3FeN_2$, $Li_7MnN_4$, and their mixtures. Examples of the carbon include graphite, graphene, hard carbon, carbon nanotube, and their mixtures. One negative electrode active material or two or more negative electrode active materials selected from these negative electrode active materials can be used.

The conductive agent is, for example, a conductive carbon. Examples of the conductive carbon include carbon black, fibrous carbon, graphite, ketjen black, and acetylene black. One conductive agent or two or more conductive agents selected from these conductive agents can be used. The conductive agent contributes to a sufficient reduction in the internal resistance of the electrode 20.

The electrode 20 may further include a binder. Examples of the binder include carboxymethyl cellulose (CMC) and styrene-butadiene rubber (SBR). One binder or two or more binders selected from these binders can be used. The binder is effective in maintaining the shape of the electrode 20.

Figure 8:
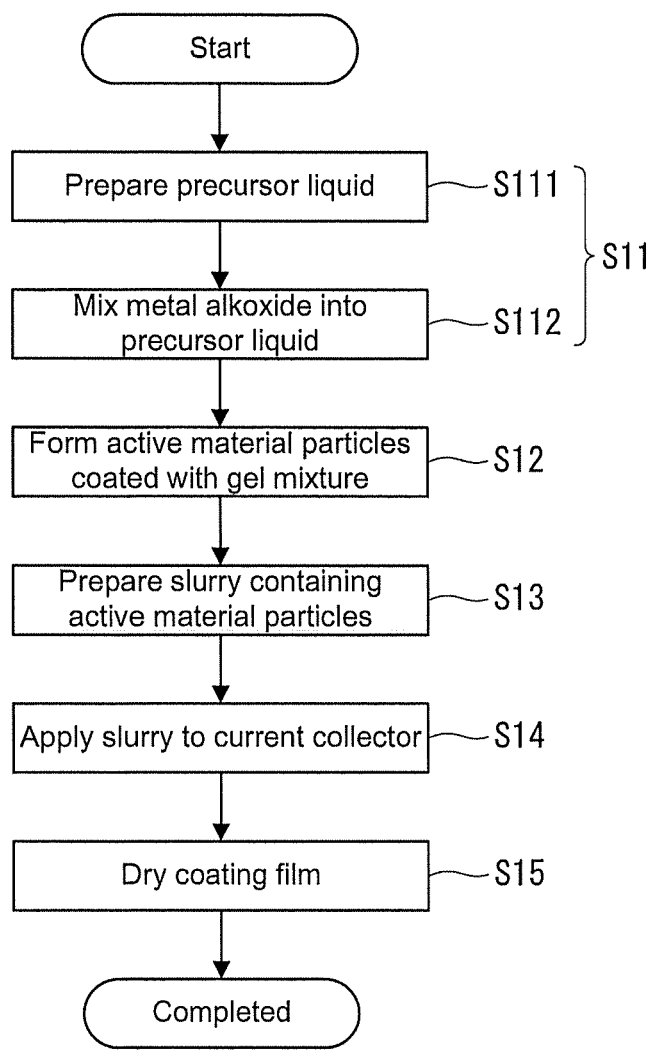
FIG. 8 is a flowchart showing an example of a method for producing the electrode according to the second embodiment.

Next, an example of a method for producing the electrode 20 will be described with reference to FIG. 8.

In a step S11, a liquid mixture containing the active material particles is prepared. The step S11 may include a sub-step S111 and sub-step S112. In the sub-step S111, a precursor liquid is prepared by mixing, for example, the ionic compound, metal salt, water, the organic solvent, and active material particles. The precursor liquid may further contain the polyether. In the sub-step S112, the metal alkoxide is mixed into the precursor liquid. A liquid mixture containing the active material particles can thus be obtained. In the sub-step S112, for example, the metal alkoxide is dropped into a container of the precursor liquid. The step S11 is the same step as the step S1 of the first embodiment, except that the active material particles are added to the liquid mixture.

In a step S12, the active material particles coated with a solid electrolyte is formed. In the step S12, for example, the operations same as those in the step S2 and step S3 of the first embodiment are carried out. Since the liquid mixture contains the active material particles, the gelation of the liquid mixture forms a gel mixture coating at least a portion of the surface of each active material particle. The active material particles coated with the gel mixture are dried to obtain the active material particles coated with the solid electrolyte.

In a step S13, a slurry containing the coated active material particles is prepared. The coated active material particles and conductive agent particles are added to an electrolyte solution or a solvent and the materials are mixed. A slurry for producing the electrode can thus be obtained. A binder may be added to the slurry, if necessary. The conductive agent may be added to the liquid mixture beforehand in the step S11. Examples of the electrolyte solution used for the preparation of the slurry include an electrolyte solution containing the metal salt and a carbonate ester. Examples of the carbonate ester include chain carbonates, cyclic carbonates, and their mixtures. The electrolyte solution can be obtained, for example, by dissolving $LiPF_6$ at a concentration of 1 mol/liter in a mixed solvent containing ethylene carbonate and diethyl carbonate at a volume ratio of 1:1. Examples of the solvent used for the preparation of the slurry include water and an organic solvent. Examples of the organic solvent include N-methylpyrrolidone (NMP).

In a step S14, the slurry is applied to a current collector to form a coating film. The method for applying the slurry is not particularly limited. The slurry is applied to the current collector, for example, by blade coating.

In a step S15, the coating film formed on the current collector is dried. The dried coating film may be extended by applying pressure so as to obtain the electrode 20 having a certain volume filling rate. The electrode 20 can thus be obtained. The coating film is dried, for example, using a vacuum dryer for 4 to 12 hours under the conditions of a pressure of 0.1 to 200 Pa and a temperature of 80 to 150° C. (ambient temperature).

Figure 9:
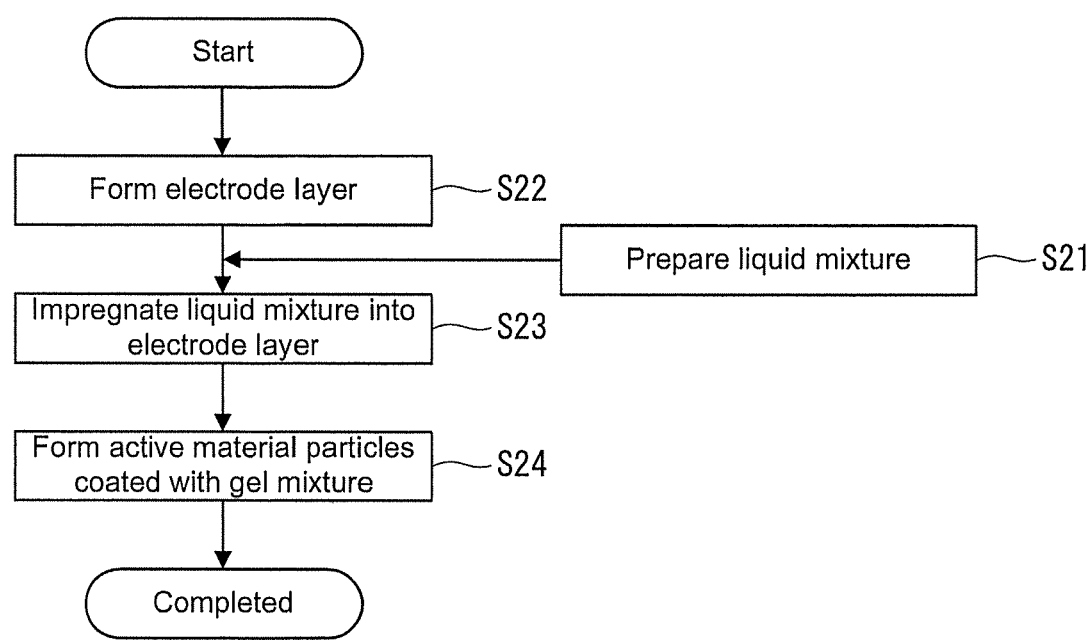
FIG. 9 is a flowchart showing another example of the method for producing the electrode according to the second embodiment.

Next, another example of the method for producing the electrode 20 will be described with reference to FIG. 9.

In a step S21, a liquid mixture is prepared. The step S21 is the same step as, for example, the step S1 of the first embodiment.

In a step S22, an electrode layer is formed on a current collector. The electrode layer can be obtained by applying a slurry containing the active material particles and conductive agent particles to the current collector and drying the resultant coating film. The slurry may be prepared by adding an electrolyte solution or an organic solvent to the active material particles and conductive agent particles and mixing the resultant mixture. In the step S22, the operations same as those in the step S14 and step S15 described with reference to FIG. 8 may be carried out.

The step S21 is independent of the step S22. The order of the step S21 and step S22 is not particularly limited.

In a step S23, the liquid mixture is impregnated into the electrode layer. To impregnate the liquid mixture into the electrode layer, the liquid mixture may be dropped on the electrode layer or the electrode layer may be immersed in the liquid mixture. The liquid mixture may partially undergo gelation before the impregnation of the electrode layer. For example, when the liquid mixture prepared is stored at room temperature for several days, the liquid mixture slightly undergoes gelation. Such a liquid mixture may be impregnated into the electrode layer.

In a step S24, the active material particles coated with a solid electrolyte is formed. The liquid mixture impregnated into the electrode layer undergoes gelation, and the resultant gel mixture is dried. In the step S24, the operations same as those in the step S2 and step S3 of the first embodiment are carried out. The electrode 20 can thus be obtained.

Figure 10:
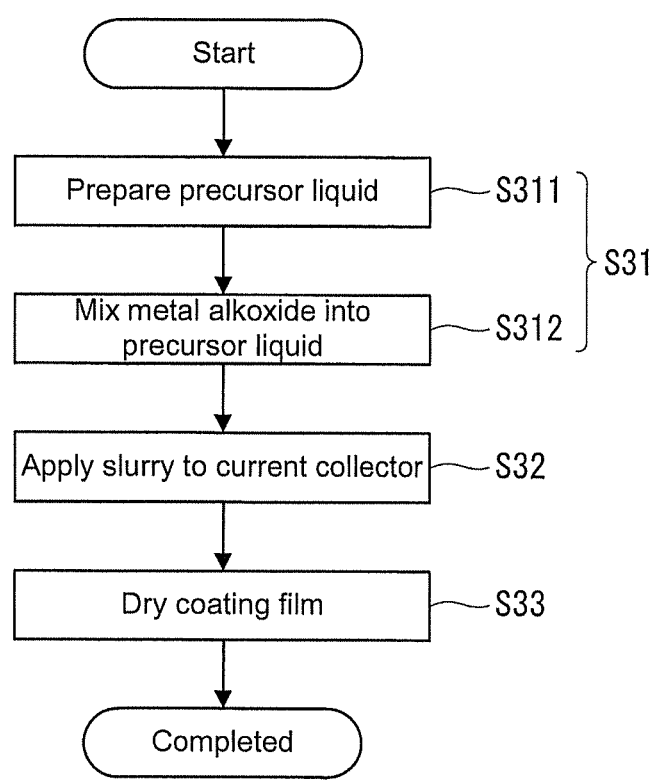
FIG. 10 is a flowchart showing yet another example of the method for producing the electrode according to the second embodiment.

Next, yet another example of the method for producing the electrode 20 will be described with reference to FIG. 10.

In a step S31, a slurry containing the active material particles is prepared. The step S31 may include a sub-step S311 and sub-step S312. In the sub-step S311, for example, the ionic compound, metal salt, water, the organic solvent, active material particles, conductive additive particles, and binder are mixed to prepare a precursor liquid. The precursor liquid may include the polyether. In the sub-step S312, the metal alkoxide is mixed in the precursor liquid. The slurry for producing the electrode can thus be obtained. In the sub-step S312, the metal alkoxide is, for example, dropped into a container of the precursor liquid.

In a step S32, the slurry is applied to a current collector to form a coating film. The method of applying the slurry is not particularly limited. The slurry is applied to the current collector, for example, by blade coating.

In a step S33, the coating film formed on the current collector is dried. The hydrolysis reaction and dehydration polycondensation reaction previously described progress by the drying of the coating film, resulting in formation of a matrix that is a solid electrolyte around the active material particles and conductive additive particles. The coating film may be stored at room temperature for a certain period of time (for example, 4 to 23 days) and subsequently dried under certain conditions. The coating film is dried, for example, using a vacuum dryer for 48 to 72 hours under the conditions of a pressure of 0.1 to 200 Pa and a temperature of 15 to 150° C. (ambient temperature). The dried coating film may be extended by applying pressure so as to obtain the electrode 20 having a certain volume filling rate. The electrode 20 can thus be obtained.

Third Embodiment

Figure 11:
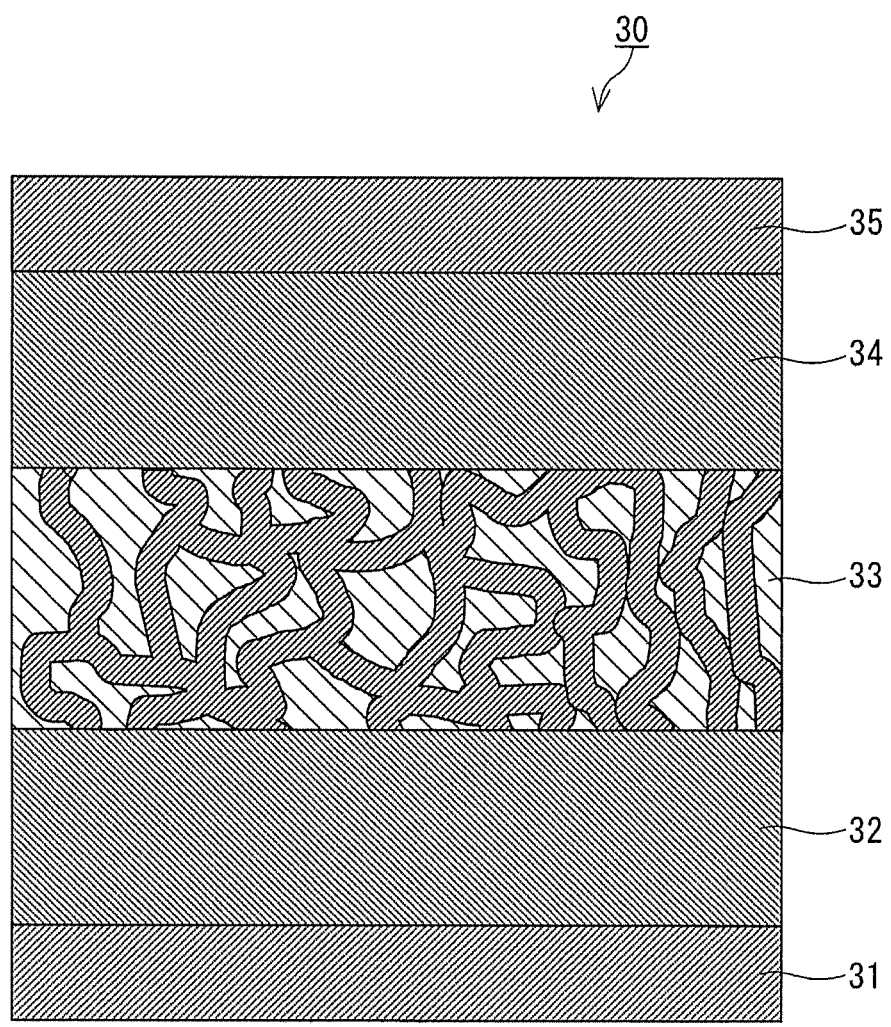
FIG. 11 schematically shows an example of a cross-sectional structure of a power storage device according to a third embodiment.

FIG. 11 schematically shows an example of a cross-sectional structure of a power storage device 30 according to a third embodiment. In FIG. 11, the power storage device 30 includes a current collector 31, positive electrode 32, solid electrolyte 33, negative electrode 34, and current collector 35. The current collector 21 described in the second embodiment can be used as the current collectors 31 and 35. The positive electrode 32 includes, for example, the positive electrode active material described in the second embodiment. The negative electrode 34 includes, for example, the negative electrode active material described in the second embodiment.

The solid electrolyte 33 is disposed between the positive electrode 32 and negative electrode 34. The solid electrolyte 10 described in the first embodiment can be used as the solid electrolyte 33. Since the solid electrolyte 10 of the present disclosure has high ionic conductivity, the power storage device 30 having excellent electrical characteristics can be obtained with the use of the solid electrolyte 10.

Fourth Embodiment

Figure 12:
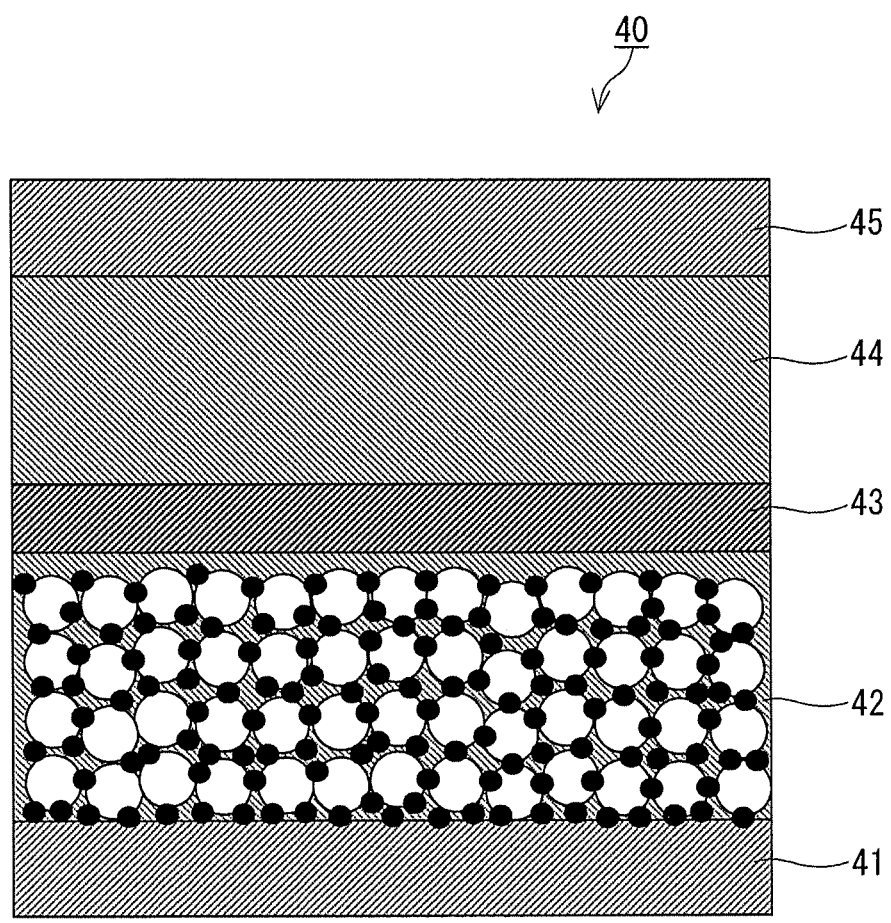
FIG. 12 schematically shows an example of a cross-sectional structure of a power storage device according to a fourth embodiment.

FIG. 12 shows an example of a cross-sectional structure of a power storage device 40 according to a fourth embodiment. In FIG. 12, the power storage device 40 includes a current collector 41, positive electrode 42, solid electrolyte 43, negative electrode 44, and current collector 45. The current collector 21 described in the second embodiment can be used as the current collectors 41 and 45. The electrode 20 described in the second embodiment can be used as the positive electrode 42. The negative electrode 44 includes, for example, the negative electrode active material described in the second embodiment.

The solid electrolyte 43 is disposed between the positive electrode 42 and negative electrode 44. The solid electrolyte 10 described in the first embodiment can be used as the solid electrolyte 43. Alternatively, the solid electrolyte 43 may be a different solid electrolyte. Examples of the different solid electrolyte include an inorganic solid electrolyte and polymer electrolyte. Examples of the inorganic solid electrolyte include an inorganic oxide and inorganic sulfide. Examples of the inorganic oxide include LiPON, LiAlTi($PO_4$)$_3$, LiAlGeTi($PO_4$)$_3$, LiLaTiO, LiLaZrO, $Li_3PO_4$, $Li_2SiO_2$, $Li_3SiO_4$, $Li_3VO_4$, $Li_4SiO_4$—$Zn_2SiO_4$, $Li_4GeO_4$—$Li_2GeZnO_4$, $Li_2GeZnO_4$—$Zn_2GeO_4$, and $Li_4GeO_4$—$Li_3VO_4$. Examples of the inorganic sulfide include $Li_2S$—$P_2S_5$, $Li_2S$—$P_2S_5$—LiI, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—GeS, $Li_2S$—$P_2S_5$—ZnS, $Li_2S$—$P_2S_5$—GaS, $Li_2S$—$GeS_2$, $Li_2S$—$SiS_2$—$Li_3PO_4$, $Li_2S$—$SiS_2$—LiPO, $Li_2S$—$SiS_2$—LiSiO, $Li_2S$—$SiS_2$—LiGeO, $Li_2S$—$SiS_2$—LiBO, $Li_2S$—$SiS_2$—LiAlO, $Li_2S$—$SiS_2$—LiGaO, $Li_2S$—$SiS_2$—LiInO, $Li_4GeS_4$—$Li_3PS_3$, $Li_4SiS_4$—$Li_3PS_4$, and $Li_3PS_4$—$Li_2S$. Examples of the polymer electrolyte include fluorine resins, polyethylene oxide, polyacrylonitrile, polyacrylates, their derivatives, and their copolymers.

The solid electrolyte 43 may be omitted when sufficient electron insulation properties can be ensured in the power storage device 40. For example, after the electrode 20 as described with reference to FIG. 7 is prepared, a liquid mixture is applied to a surface of the electrode 20 to form a coating film. A thin solid electrolyte layer can be formed on the electrode 20 by gelation and drying of the coating film. When this thin layer is sufficient to prevent a short circuit between the positive electrode and negative electrode, no solid electrolyte serving as a separator is separately needed.

In the power storage device 40 shown in FIG. 12, the solid electrolyte-including electrode of the present disclosure is employed only as the positive electrode 42.

Fifth Embodiment

Figure 13:
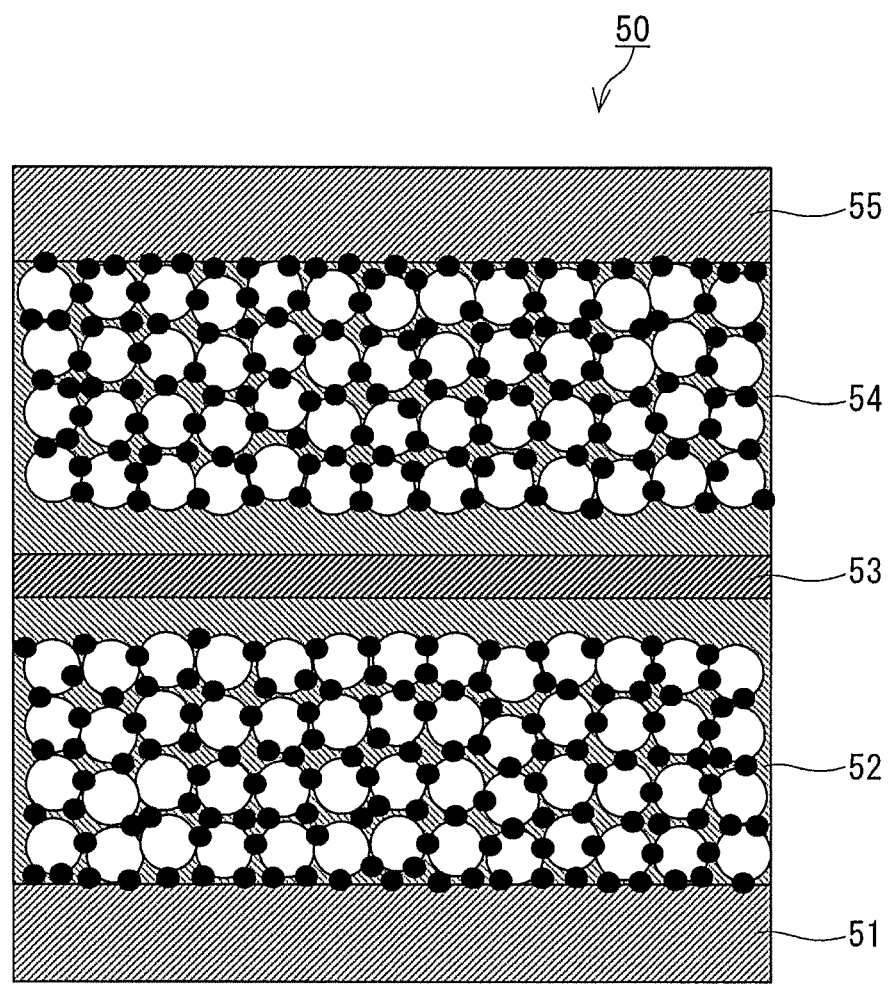
FIG. 13 schematically shows an example of a cross-sectional structure of a power storage device according to a fifth embodiment.

FIG. 13 shows an example of a cross-sectional structure of a power storage device 50 according to a fifth embodiment. In FIG. 13, the power storage device 50 includes a current collector 51, positive electrode 52, solid electrolyte 53, negative electrode 54, and current collector 55. The current collector 21 described in the second embodiment can be used as the current collectors 51 and 55. The electrode 20 described in the second embodiment can be used as the positive electrode 52 and negative electrode 54. The solid electrolyte 53 is disposed between the positive electrode 52 and negative electrode 54. The solid electrolyte 10 described in the first embodiment can be used as the solid electrolyte 53. Alternatively, the solid electrolyte 53 may be a different solid electrolyte. In the present embodiment, the solid electrolyte-including electrode of the present disclosure is employed as both the positive electrode 52 and negative electrode 54. The solid electrolyte-including electrode of the present disclosure may be employed only as the negative electrode 54.

According to the fourth and fifth embodiments, the electrode 20 of the present disclosure is used as at least one selected from the positive electrode and negative electrode. The electrode 20 includes the solid electrolyte 10 of the present disclosure. Since the solid electrolyte 10 has high ionic conductivity, a power storage device having excellent electrical characteristics can be obtained by the use of the solid electrolyte 10.

EXAMPLES (Sample 1a)
BMP-TFSI, Li-TFSI, 0.5 ml of TEOS, 1.0 ml of PGME, and 0.5 ml of water were placed in a glass container and mixed to obtain a liquid mixture. The mixing ratio of TEOS, BMP-TFSI, and Li-TFSI was TEOS:BMP-TFSI:Li-TFSI=1.0:1.5:0.5 on a molar basis.

Next, the glass container was sealed and the liquid mixture was stored at 25° C. The liquid mixture turned into a wet gel mixture in 5 to 17 days.

Then, the gel mixture was pre-dried using a hot plate equipped with a desiccator at 40° C. and 80 kPa for 96 hours. Afterwards, the gel mixture was put in a vacuum oven and dried at 25° C. and 0.1 Pa or less for 72 hours. A solid electrolyte of Sample 1a was thus obtained.

The solid electrolyte of Sample 1a was stored in a glove box (humidity<0.0005% RH) and measured for the ionic conductivity at about 23 to 24° C. by an AC impedance method. A change over time in ionic conductivity was also measured.

(Reference Sample 1)
An electrolyte solution containing only BMP-TFSI and Li-TFSI was prepared as an electrolyte of Reference Sample 1. The mixing ratio between BMP-TFSI and Li-TFSI was BMP-TFSI:Li-TFSI=3.0:1.0 on a molar basis. The ionic conductivity of the electrolyte of Reference Sample 1 at about 23 to 24° C. was measured by an AC impedance method. The ionic conductivity of the electrolyte of Reference Sample 1 is 0.6 mS/cm.

Figure 14:
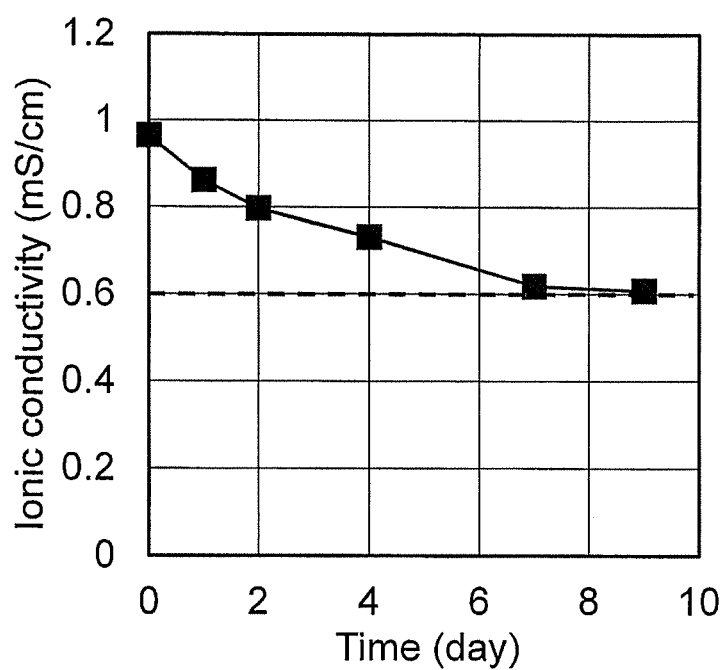

FIG. 14 shows the change over time in ionic conductivity of the solid electrolyte of Sample 1a. The vertical axis represents the ionic conductivity. The horizontal axis represents a period of time (days) following the production. The dotted line represents the ionic conductivity (0.6 mS/cm) of the electrolyte of Reference Sample 1. Immediately after the production, the ionic conductivity of the solid electrolyte of Sample 1a was higher than the ionic conductivity of the electrolyte of Reference Sample 1. By storing the solid electrolyte of Sample 1a in a low-humidity environment (<0.0005% RH), the ionic conductivity of the solid electrolyte of Sample 1a gradually decreased. When the equilibrium state was reached after 7 to 10 days, the solid electrolyte of Sample 1a exhibited an ionic conductivity comparable to the ionic conductivity of the electrolyte of Reference Sample 1.

The change over time in ionic conductivity shown in FIG. 14 is inferred to be attributable to the mechanism described below.

Figure 15A:
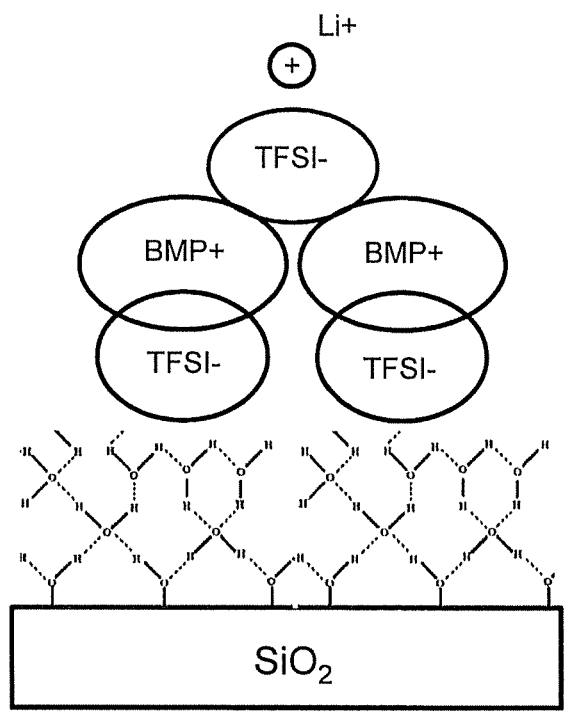
FIG. 15A schematically shows a configuration of a surface adsorption layer observed immediately after the solid electrolyte of Sample 1a is stored.
Figure 15B:
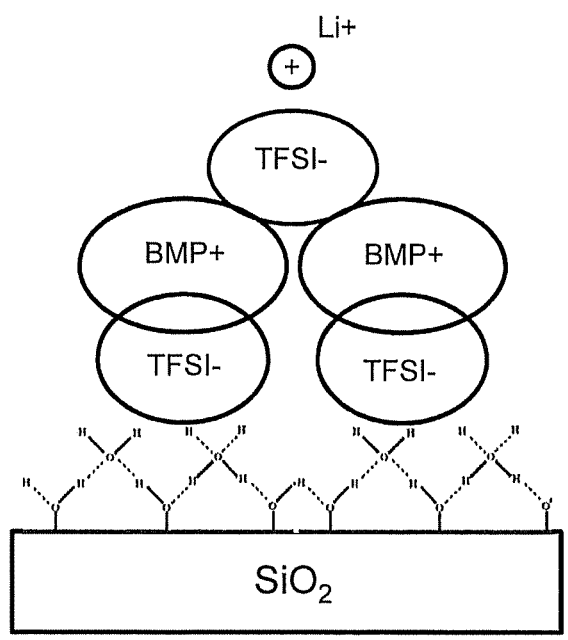
FIG. 15B schematically shows a configuration of the surface adsorption layer observed after the solid electrolyte of Sample 1a is stored in a low-humidity environment.

FIG. 15A schematically shows a configuration of the surface adsorption layer observed immediately after the solid electrolyte of Sample 1a is produced. FIG. 15B schematically shows a configuration of the surface adsorption layer observed after the solid electrolyte of Sample 1a is stored in the low-humidity environment.

As shown in FIG. 15A, an adsorbed water layer is formed as the surface adsorption layer in the solid electrolyte of Sample 1a. The adsorbed water layer is thick and dense immediately after the solid electrolyte of Sample 1a is produced. Thus, ionic polarization is strongly induced in the polarization layer, and the force by which the TFSI$^-$ ion directly below the Li$^+$ ion draws the Li$^+$ ion is weakened to make it easy for the Li$^+$ ion to move. Consequently, the solid electrolyte of Sample 1a exhibits a high ionic conductivity.

As shown in FIG. 15B, storing the solid electrolyte of Sample 1a in a low-humidity environment (<0.0005% RH) decreases the thickness and density of the adsorbed water layer. The mobility of the Li$^+$ ion decreases to the same level as that in the electrolyte of Reference Sample 1 having no surface adsorption layer. As a result, the solid electrolyte of Sample 1a exhibits an ionic conductivity close to the ionic conductivity (0.6 mS/cm) of the electrolyte of Reference Sample 1.

(Sample 1b)

A solid electrolyte of Sample 1b was produced in the same manner as for Sample 1a, except that the mixing ratio between TEOS, BMP-TFSI, and Li-TFSI was changed to TEOS:BMP-TFSI:Li-TFSI=1.0:1.0:0.5 on a molar basis.

(Sample 1c)

A solid electrolyte of Sample 1c was produced in the same manner as for Sample 1a, except that the mixing ratio between TEOS, BMP-TFSI, and Li-TFSI was changed to TEOS:BMP-TFSI:Li-TFSI=1.0:2.0:0.5 on a molar basis.

Next, the solid electrolytes of Samples 1a, 1b, and 1c were stored in an airtight container in which humidity is controllable. The ionic conductivity at about 23 to 24° C. was measured for the solid electrolytes of Samples 1a, 1b, and 1c at a relative humidity adjusted to 10% RH, 30% RH, 50% RH, 60% RH, or 85% RH by an AC impedance method. The results are shown in FIG. 16A.

Figure 16A:
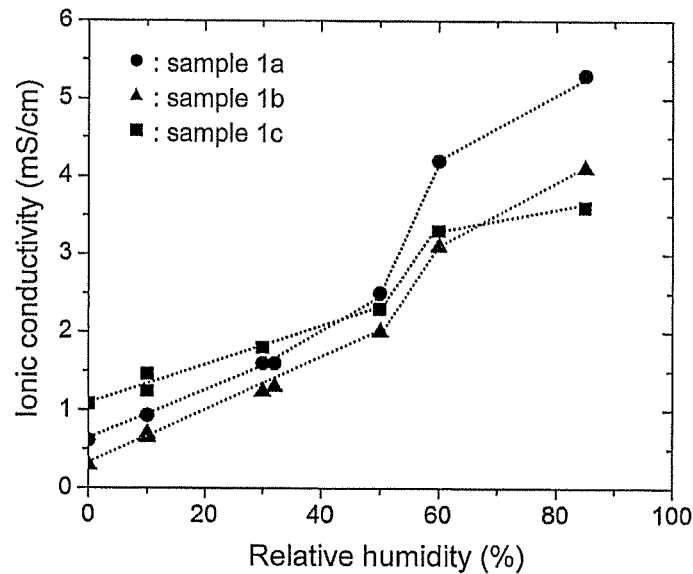
FIG. 16A is a graph showing the relationships between the ionic conductivity of the solid electrolytes of Samples 1a, 1b, and 1c and the relative humidity at the time of measurement.

FIG. 16A shows the relationships between the ionic conductivity of the solid electrolytes of Samples 1a, 1b, and 1c and the relative humidity at the time of the measurement. The vertical axis represents the ionic conductivity. The horizontal axis represents the relative humidity.

As shown in FIG. 16A, every sample showed the following tendencies. Firstly, in a zone where the relative humidity was 0 to 30% RH, the ionic conductivity slowly increased with an increase in relative humidity. Secondly, around a relative humidity of 50 to 60% RH, the increase in ionic conductivity was dramatic considering the increase in relative humidity. Thirdly, in a zone where the relative humidity exceeded 60% RH, the ionic conductivity slowly increased again with the increase in relative humidity.

These tendencies are explained by the adsorbed water condition that changes in accordance with the increase in relative humidity.

The relationship between the condition of adsorbed water on the surface of SiO$_2$ and the relative humidity is described in detail in a prior paper (D. B. Assay, S. H. Kim, "Evolution of the Adsorbed Water Layer Structure on Silicon Oxide at Room Temperature", J. Phys. Chem. B, vol. 109, pp. 16760-16763, 2005). According to this paper, the condition of adsorbed water on the surface of SiO$_2$ undergoes the following change among a zone where the relative humidity is 0 to 30% RH, a zone where the relative humidity is 30 to 60% RH, and a zone where the relative humidity is 60% RH or more. Firstly, in the zone where the relative humidity is 0 to 30% RH, a water layer having an ice-like structure is formed on the surface of SiO$_2$. Secondary, in the zone where the relative humidity is 30 to 60% RH, a transition layer in which transition from the ice-like structure to a liquid-like structure takes place is formed on the ice-like structure. Thirdly, in the zone where the relative humidity is more than 60% RH, a water layer having the liquid-like structure is formed on the transition layer.

It is thought that the ionic conductivity change shown in FIG. 16A reflects this change in adsorbed water condition. A mechanism inferred by the present inventors suggests that the ionic conductivity improvement owing to adsorbed water depends on the adsorbed water condition. When adsorbed water forms the ice-like structure, the ionic conductivity depends on the force by which adsorbed water draws the charges of the ions in the polarization layer. As the formation of the ice-like structure of adsorbed water progresses, the density of the hydrogen bond in the surface adsorption layer is increased and the surface adsorption layer strongly draws the charges of the ions in the polarization layer. This weakens the Coulomb interaction acting on the conduction ion, so that the ionic conductivity can be increased. In FIG. 16A, the tendency for the ionic conductivity to increase with the increase in relative humidity in a zone where the relative humidity is 0 to 50% RH reflects these actions. The ionic conductivity drastically increases around a relative humidity of 50 to 60% RH not only because of the above actions but also for the following reason: Since the liquid-like water layer began to be formed as the surface adsorption layer, the lithium ions were dissolved in the liquid-like water layer and dissociation and diffusion of the lithium ions were promoted.

As described above, the relationships between the ionic conductivity and relative humidity indicate that in the solid electrolytes of Samples 1a, 1b, and 1c, the adsorbed water layer was formed on the inner surface of the pore of porous silica.

(Sample 1d)

A solid electrolyte of Sample 1d was produced in the same manner as for Sample 1a.

(Sample 1e)

A solid electrolyte of Sample 1e was produced in the same manner as for Sample 1a, except that the pre-drying time was changed to 72 hours.

(Samples 1f and 1g)

Solid electrolytes of Samples 1f and 1g were simultaneously produced in the same manner as for Sample 1a, except that the volume of the liquid mixture was twice greater than that for Sample 1a and that the two samples were simultaneously produced. Samples 1f and 1g were simultaneously dried and the total volume of gel mixtures of Samples 1f and 1g was about twice greater than the volume of the gel mixture of Sample 1a. Therefore, both Samples 1f and 1g were not as dry as Sample 1a.

The ionic conductivity at about 23 to 24° C. was measured for the solid electrolytes of Samples 1d to 1g by the AC impedance method.

The numbers of monolayers of adsorbed water in the solid electrolytes of Samples 1d to 1g were estimated by the following method. First, the specific surface area of each sample was derived using the BET method. Next, the mass of residual moisture in each sample was measured. Assuming that the residual moisture (i) had the ice-like structure and (ii) was adsorbed on the entire surface estimated by the BET method, the thickness of the adsorbed water layer was calculated. Lastly, the thickness calculated was converted to the number of monolayers (1 ML=0.25 nm) of water.

Figure 16B:
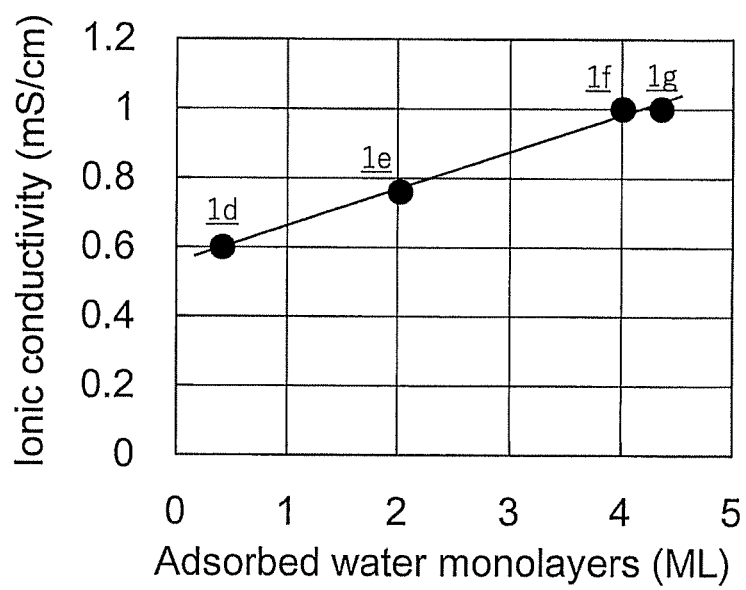
FIG. 16B is a graph showing the relationship between the ionic conductivity of solid electrolyte of Samples 1d to 1g and the number of monolayers of adsorbed water.

FIG. 16B is a graph showing the relationship between the ionic conductivity of the solid electrolytes of Samples 1d to 1g and the number of monolayers of adsorbed water. As shown in FIG. 16B, in a range where the number of monolayers of adsorbed water is 1 to 4 ML, the ionic conductivity increased with an increase in the number of layers. This result indicates that 1 to 4 ML of adsorbed water having the ice-like structure contributes to the improvement of the ionic conductivity.

(FT-IR Measurement)

FT-IR measurement was carried out for the solid electrolyte of Sample 1a to confirm the presence of the adsorbed water layer serving as the surface adsorption layer. FT-IR measurement was carried out at the timings (a) to (e) below. Additional vacuum drying was carried out at 25° C. and 0.1 Pa or less for 72 hours. The storage temperature was about 23 to 24° C. A humidity environment was set by introducing water vapor into a glove box in which the solid electrolyte of Sample 1a was placed. The results are shown in FIG. 17A and FIG. 17B.

Figure 17A:
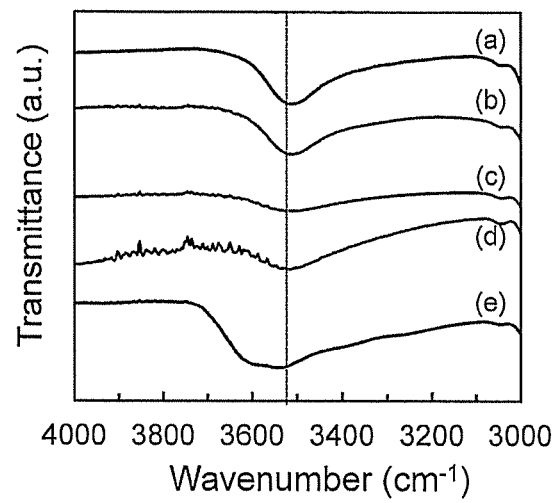
FIG. 17A is a graph showing results of FT-IR measurement of the solid electrolyte of Sample 1a in a wavenumber range around 3540 $cm^{-1}$.

(a) Immediately after the production of the solid electrolyte of Sample 1a (b) After an 8-day or longer storage of the solid electrolyte of Sample 1a in an environment at a low humidity of 0.0005% RH (c) After the additional vacuum drying (d) After a two-day storage in an environment at a humidity of 30% RH (e) After a two-day storage in an environment at a humidity of 60% RH FIG. 17A shows FT-IR spectra of the solid electrolyte of Sample 1a in a wavenumber range around 3540 cm$^{-1}$. The peaks at 3540 cm$^{-1}$ are attributable to SiO—H stretching vibration and indicates the presence of a water layer having an ice-like structure. However, the shape of the peak of the spectrum (e) is slightly different from the shapes of the peaks of other spectra.

Figure 17B:
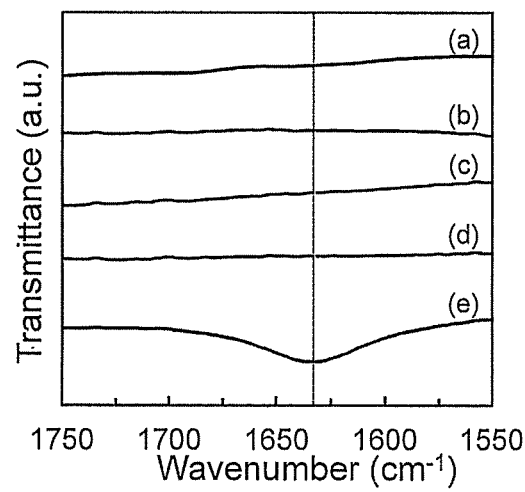
FIG. 17B is a graph showing results of FT-IR measurement of the solid electrolyte of Sample 1a in a wavenumber range around 1630 $cm^{-1}$.

FIG. 17B shows FT-IR spectra of the solid electrolyte of Sample 1a in a wavenumber range around 1630 cm$^{-1}$. Only the spectrum (e) has a peak around 1630 cm$^{-1}$.

FIG. 17A and FIG. 17B show a change in surface adsorbed water condition and support the behavior described with reference to FIG. 16A. Additionally, the results shown in FIG. 17A and FIG. 17B agree with the report by D. B. Assay et al.

(Sample 2a)

BMP-TFSI, Li-TFSI, 0.5 ml of TEOS, 1.0 ml of PGME, PEG (polyethylene glycol; number average molecular weight: 20000), and 0.5 ml of water were placed in a glass container and mixed to obtain a liquid mixture. The mixing ratio of TEOS, BMP-TFSI, and Li-TFSI was TEOS:BMP-TFSI:Li-TFSI=1.0:1.5:0.5 on a molar basis. The amount of PEG was 1.0 weight % with respect to the total weight of BMP-TFSI, Li-TFSI, TEOS, PGME, and water.

Next, the glass container of the liquid mixture was sealed and stored at 25° C. The liquid mixture turned into a wet gel mixture in 5 to 17 days.

Then, the gel mixture was pre-dried using a hot plate equipped with a desiccator at 40° C. and 80 kPa for 96 hours. Afterwards, the gel mixture was put in a vacuum oven and dried at 25° C. and 0.1 Pa or less for 72 hours. A solid electrolyte of Sample 2a was thus obtained.

The solid electrolyte of Sample 2a was stored in a glove box (humidity<0.0005% RH) and measured for the ionic conductivity at about 23 to 24° C. by the AC impedance method. The result is shown in FIG. 18.

Figure 18:
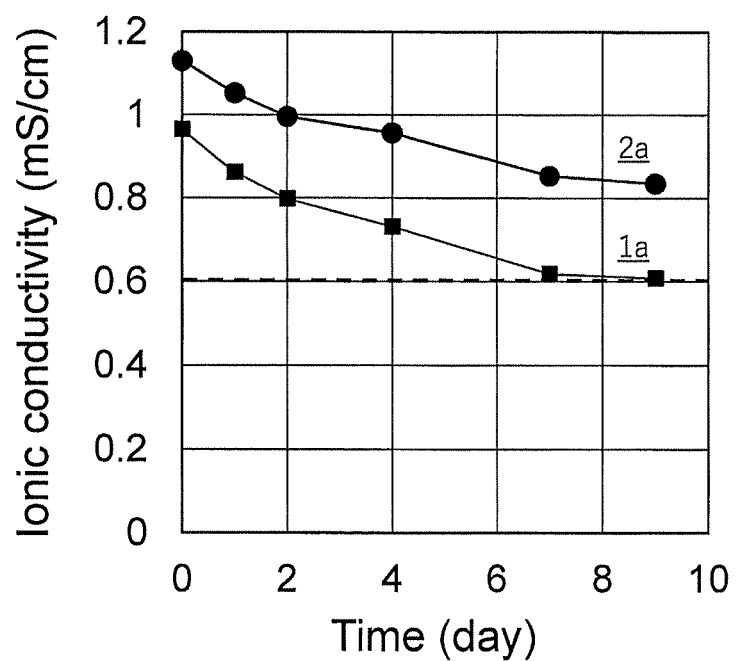

FIG. 18 shows changes over time in ionic conductivity of the solid electrolytes of Samples 1a and 2a. The vertical axis represents the ionic conductivity. The horizontal axis represents a period of time (days) following the production. In the graph, the line representing Sample 1a is the same as that in FIG. 14. The ionic conductivity of the solid electrolyte of Sample 2a including PEG gradually decreased through the storage in the low-humidity environment (<0.0005% RH), as in the case of Sample 1a. However, when the equilibrium state was reached after 7 to 10 days, the solid electrolyte of Sample 2a exhibited higher ionic conductivities than the solid electrolytes of Reference Sample 1 and Sample 1a.

Figure 19:
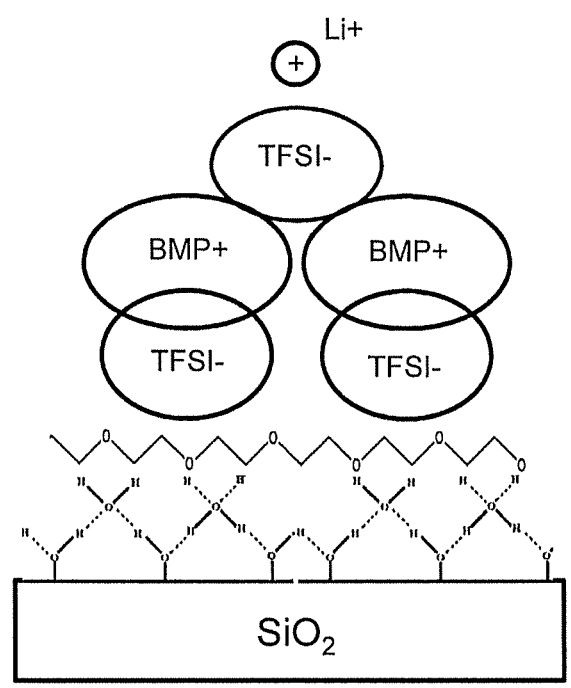

FIG. 19 schematically shows a structure of the surface adsorption layer of the solid electrolyte of Sample 2a. As shown in FIG. 19, adsorbed water layer and PEG layer were formed as the surface adsorption layer in the solid electrolyte of Sample 2a. In an example shown in FIG. 19, water molecules are adsorbed on porous silica to form the adsorbed water layer. The PEG layer is located between the adsorbed water layer and polarization layer.

Although storing the solid electrolyte of Sample 2a in the low-humidity environment (<0.0005% RH) decreases the thickness and density of the adsorbed water layer, the PEG layer is maintained. Therefore, the force by which the TFSI$^-$ ion directly below the Li$^+$ ion draws the Li$^+$ ion is weakened to make it easy for the Li$^+$ ion to move. Consequently, the solid electrolyte of Sample 2a exhibits a high ionic conductivity.

(Sample 2b)

A solid electrolyte of Sample 2b was produced in the same manner as for Sample 2a, except that the ratio of the amount of PEG to the total weight of BMP-TFSI, Li-TFSI, TEOS, PGME, and water was changed to 0.5 weight %.

(Sample 2c)

A solid electrolyte of Sample 2c was produced in the same manner as for Sample 2a, except that the ratio of the amount of PEG to the total weight of BMP-TFSI, Li-TFSI, TEOS, PGME, and water was changed to 5.0 weight %.

The solid electrolytes of Sample 2b and Sample 2c were stored in a glove box (humidity<0.0005% RH) for 7 days and measured for the ionic conductivity at about 23 to 24° C. by the AC impedance method. The results are shown in FIG. 20.

Figure 20:
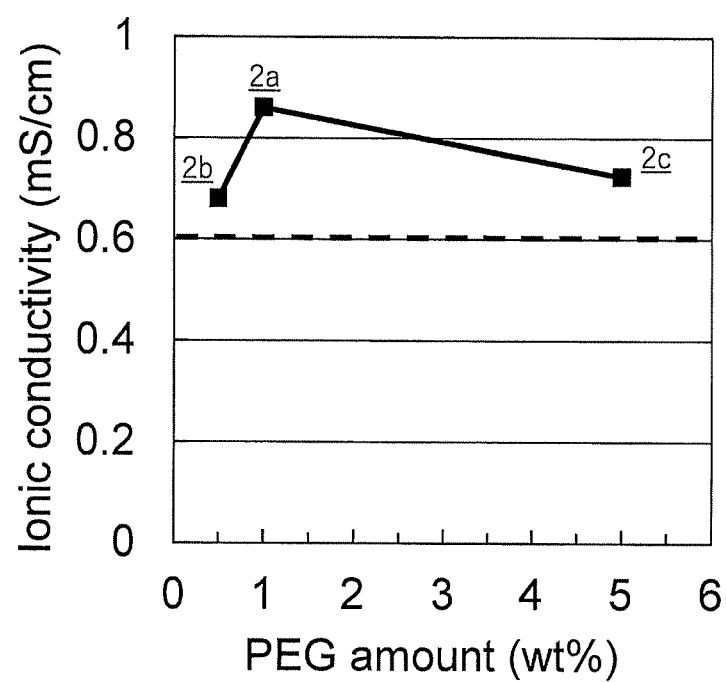
FIG. 20 is a graph showing the relationship between the ionic conductivity of the solid electrolytes of Samples 2a, 2b, and 2c and the amount of PEG added.

FIG. 20 shows the relationship between the ionic conductivity of the solid electrolytes of Samples 2a, 2b, and 2c and the amount of PEG added. The vertical axis represents the ionic conductivity. The horizontal axis represents the ratio of the amount of PEG to the total weight of BMP-TFSI, Li-TFSI, TEOS, PGME, and water. The dotted line represents the ionic conductivity (0.6 mS/cm) of the electrolyte of Reference Sample 1.

The solid electrolytes of Samples 2a, 2b, and 2c all exhibited higher ionic conductivities than the electrolyte of Reference Sample 1. The addition of PEG effectively increased the ionic conductivity. Additionally, the ionic conductivity changed depending on the amount of PEG added. This indicates that there is an optimal value of the amount of PEG added.

(Sample 3a)

A solid electrolyte of Sample 3a was produced in the same manner as for Sample 2a, except that a PEG having a number average molecular weight of 200 was used instead of the PEG having a number average molecular weight of 20000.

(Sample 3b)

A solid electrolyte of Sample 3b was produced in the same manner as for Sample 2a, except that a PEG having a number average molecular weight of 400 was used instead of the PEG having a number average molecular weight of 20000.

(Sample 3c)

A solid electrolyte of Sample 3c was produced in the same manner as for Sample 2a, except that a PEG having a number average molecular weight of 1000 was used instead of the PEG having a number average molecular weight of 20000.

(Sample 3d)

A solid electrolyte of Sample 3d was produced in the same manner as for Sample 2a, except that a PEG having a number average molecular weight of 4000 was used instead of the PEG having a number average molecular weight of 20000.

(Sample 3e) A solid electrolyte of Sample 3e was produced in the same manner as for Sample 2a, except that a PEG having a number average molecular weight of 8000 was used instead of the PEG having a number average molecular weight of 20000.

(Sample 3f)

A solid electrolyte of Sample 3f was produced in the same manner as for Sample 2a, except that a PEG having a viscosity average molecular weight of 600000 was used instead of the PEG having a number average molecular weight of 20000.

The solid electrolytes of Samples 3a to 3f were stored in a glove box (humidity<0.0005% RH) for 7 days and measured for the ionic conductivity at about 23 to 24° C. by the AC impedance method. The results are shown in FIG. 21.

Figure 21:
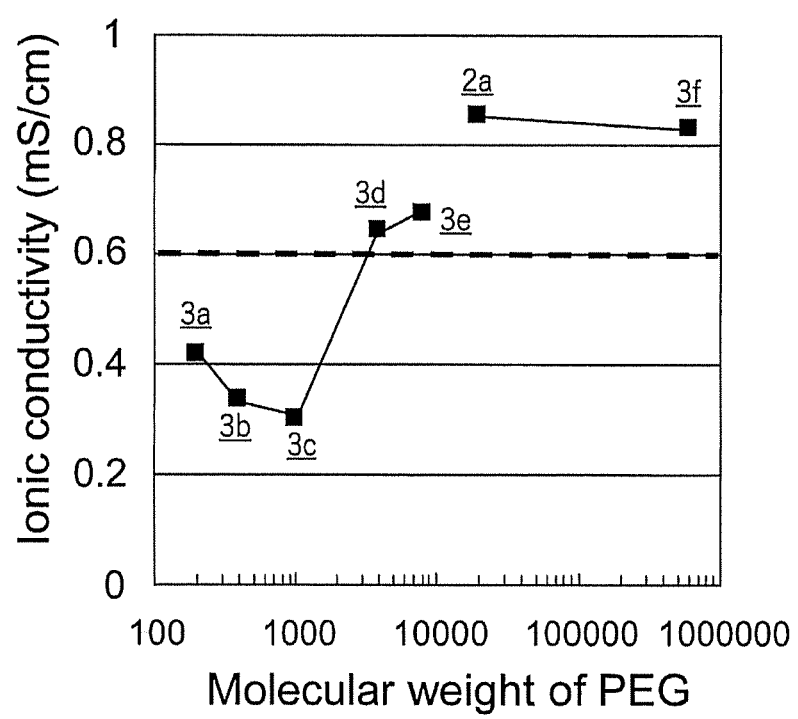
FIG. 21 is a graph showing the relationship between the ionic conductivity of the solid electrolytes of Samples 2a and 3a to 3f and the average molecular weight of PEG.

FIG. 21 shows the relationship between the ionic conductivity of the solid electrolytes of Samples 2a and 3a to 3f and the average molecular weight of the PEGs. The vertical axis represents the ionic conductivity. The horizontal axis represents the average molecular weight of PEG. It should be noted that in FIG. 21, the average molecular weight for Sample 3f refers to the viscosity average molecular weight, and the average molecular weight for Samples 2a and 3a to 3e refers to the number average molecular weight. The dotted line represents the ionic conductivity (0.6 mS/cm) of the electrolyte of Reference Sample 1.

The ionic conductivity increased with an increase in average molecular weight of PEG. The solid electrolytes of Samples 3d, 3e, 2a, and 3f for which the PEGs having average molecular weights of 4000 or more were used exhibited ionic conductivities higher than the ionic conductivity (0.6 mS/cm) of the electrolyte of Reference Sample 1. The ionic conductivity reached the maximum value when the average molecular weight of PEG was around 20000.

(FT-IR Measurement)

FT-IR measurement was carried out for the solid electrolytes of Samples 2a and 3a to 3f. For comparison, a PEG (number average molecular weight: 8000) alone was also subjected to the FT-IR measurement. The results are shown in FIG. 22.

Figure 22:
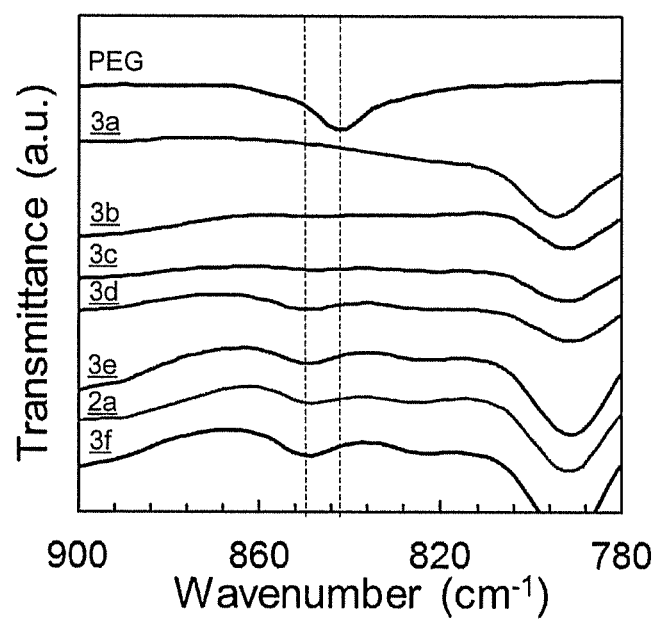
FIG. 22 is a graph showing results of FT-IR measurement of the solid electrolytes in a wavenumber range around 840 $cm^{-1}$.

FIG. 22 shows FT-IR spectra of the solid electrolytes in a wavenumber range around 840 $cm^{-1}$. The peak around 840 $cm^{-1}$ is attributable to C—O—C vibration. For the PEG alone, a peak around 840 $cm^{-1}$ appeared. For Samples 3a to 3c, no peaks attributable to C—O—C vibration appeared. This means that the PEGs were not adsorbed on the inner surface of the pore of $SiO_2$, that is, the surface adsorption layers of the PEGs were not formed. The reasons for the failure to form the surface adsorption layer include that the low-molecular-weight PEGs were each dissolved in the liquid mixture at the time of mixing the raw materials and unlikely to form a bond with TEOS. It is inferred that Samples 3a to 3c shows no peak attributable to C—O—C vibration because the dissolved PEGs were decomposed in the pre-drying and/or drying process.

Additionally, in FIG. 21, one possible reason why the ionic conductivities of the solid electrolytes of Samples 3a to 3c were lower than that of the electrolyte of Reference Sample 1 is that ion movement was interrupted by impurities produced by the decomposition of the PEGs.

For Samples 2a and 3d to 3f, peaks attributable to C—O—C vibration appeared. The peaks were shifted to the high wavenumber side. The shift of the peaks indicates that a PEG molecule was not dissolved in the ionic liquid and remained and that an oxygen atom in a C—O—C bond was bonded to the Si—OH group on the surface of $SiO_2$ or the hydrogen atom of the adsorbed water layer. It can be thought that because the PEGs were each included in the surface adsorption layer, the structure as described with reference to FIG. 19 was formed and the force by which the $TFSI^-$ ion directly below the $Li^+$ ion draws the $Li^+$ ion was weakened to make it easy for the $Li^+$ ion to move. It is thought that the solid electrolytes of Samples 2a and 3d to 3f consequently exhibited high ionic conductivities.

(Sample 4a)

TES-TFSI, Li-TFSI, 0.5 ml of TEOS, 1.0 ml of PGME, and 0.5 ml of water were placed in a glass container and mixed to obtain a liquid mixture. The mixing ratio of TEOS, TES-TFSI, and Li-TFSI was TEOS:TES-TFSI:Li-TFSI=1.0:2.5:0.83 on a molar basis.

Next, the glass container of the liquid mixture was sealed and stored at 25° C. The liquid mixture turned into a wet gel mixture in 5 to 17 days.

Then, the gel mixture was pre-dried using a hot plate equipped with a desiccator at 40° C. and 80 kPa for 96 hours. Afterwards, the gel mixture was put in a vacuum oven and dried at 25° C. and 0.1 Pa or less for 72 hours. A solid electrolyte of Sample 4a was thus obtained.

(Sample 4b)

TES-TFSI, Li-TFSI, 0.5 ml of TEOS, 1.0 ml of PGME, PEG (polyethylene glycol; number average molecular weight: 400), and 0.5 ml of water were placed in a glass container and mixed to obtain a liquid mixture. The mixing ratio of TEOS, TES-TFSI, and Li-TFSI was TEOS:TES-TFSI:Li-TFSI=1.0:2.5:0.83 on a molar basis. The amount of PEG was 1.0 weight% with respect to the total weight of TES-TFSI, Li-TFSI, TEOS, PGME, and water.

Next, the glass container of the liquid mixture was sealed and stored at 25° C. The liquid mixture turned into a wet gel mixture in 5 to 17 days.

Then, the gel mixture was pre-dried using a hot plate equipped with a desiccator at 40° C. and 80 kPa for 96 hours. Afterwards, the gel mixture was put in a vacuum oven and dried at 25° C. and 0.1 Pa or less for 72 hours. A solid electrolyte of Sample 4b was thus obtained.

(Sample 4c)

A solid electrolyte of Sample 4c was produced in the same manner as for Sample 4b, except that a PEG having a number average molecular weight of 8000 was used instead of the PEG having a number average molecular weight of 400.

(Sample 4d)

A solid electrolyte of Sample 4d was produced in the same manner as for Sample 4b, except that a PEG having a number average molecular weight of 20000 was used instead of the PEG having a number average molecular weight of 400.

The solid electrolytes of Samples 4a to 4d were stored in a glove box (humidity<0.0005% RH) for 7 days and measured for the ionic conductivity at about 23 to 24° C. by the AC impedance method. The results are shown in FIG. 23.

(Reference Sample 2)

An electrolyte solution containing only TES-TFSI and Li-TFSI was prepared as an electrolyte of Reference Sample 2. The mixing ratio between TES-TFSI and Li-TFSI was TES-TFSI:Li-TFSI=3.0:1.0 on a molar basis. The ionic conductivity of the electrolyte of Reference Sample 2 at about 23 to 24° C. was measured by the AC impedance method. The ionic conductivity of the electrolyte of Reference Sample 2 is 1.8 mS/cm.

Figure 23:
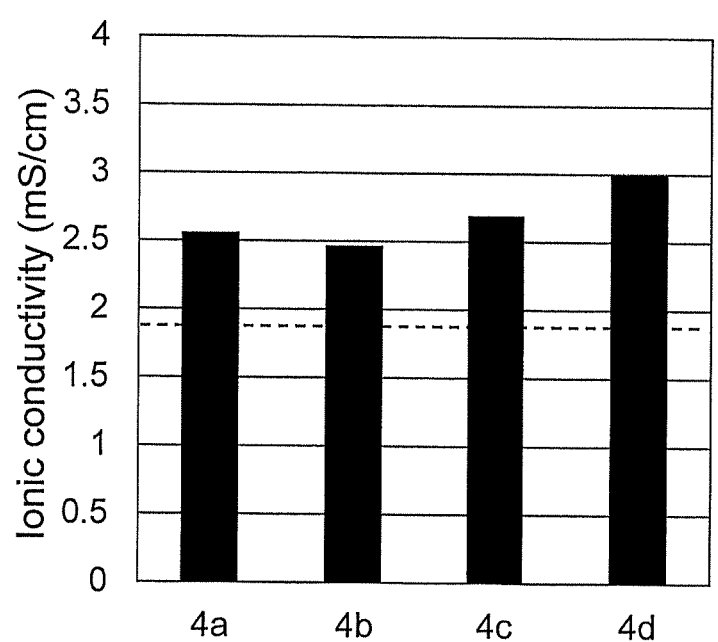
FIG. 23 is a histogram showing the ionic conductivity of solid electrolytes of Samples 4a, 4b, 4c, and 4d.

FIG. 23 shows the ionic conductivities of the solid electrolytes of Samples 4a, 4b, 4c, and 4d. The dotted line represents the ionic conductivity (1.8 mS/cm) of the electrolyte of Reference Sample 2. The solid electrolytes of Samples 4a, 4b, 4c, and 4d exhibited ionic conductivities higher than the ionic conductivity (1.8 mS/cm) of the electrolyte of Reference Sample 2 in a low-humidity environment.

As shown in FIG. 23, the solid electrolytes of Samples 4c and 4d including the high-molecular-weight PEGs exhibited ionic conductivities higher than that of the solid electrolyte of Sample 4a including no PEG. The solid electrolyte of Sample 4b including the low-molecular-weight PEG exhibited an ionic conductivity slightly lower than that of the solid electrolyte of Sample 4a. These tendencies agree with the results shown in FIG. 21.

The improvement of the ionic conductivity by PEG is inferred to be achieved depending on the solubility of PEG in the liquid mixture, as described above. It is therefore thought that the ionic conductivity can be improved using a high-molecular-weight PEG (having a number average molecular weight of, for example, 4000 or more), regardless of the type of the ionic liquid.

(Sample 5a)

The solid electrolyte of Sample 1a was put in a thermo-hygrostat and stored at 25° C. and 50% RH for 96 hours.

Next, PEG (number average molecular weight: 8000) was placed in a container holding the solid electrolyte as obtained in Sample 1a. The lid of the container was closed, and the container was stored at 70° C. for 72 hours. The amount of the PEG was 1.0 weight % with respect to the total weight of BMP-TFSI, Li-TFSI, TEOS, PGME, and water. The PEG was thus dispersed in the solid electrolyte. Afterwards, the solid electrolyte was stored in a glove box (humidity<0.0005% RH) for 24 hours. A solid electrolyte of Sample 5a was thus obtained.

The ionic conductivity of the solid electrolyte of Sample 5a at about 23 to 24° C. was measured by the AC impedance method. The ionic conductivity of the solid electrolyte of Sample 5a was turned out to be 0.25 mS/cm, which is lower than the ionic conductivity (0.6 mS/cm) of the electrolyte of Reference Sample 1. This indicates that a PEG-including surface adsorption layer is not formed by bringing the PEG into contact with the solid electrolyte after the formation of porous silica.

In the solid electrolyte of Sample 5a, the PEG is thought to have been dissolved in the ionic liquid composing the bulk layer. It is thought that this dissolution of the PEG resulted in the ionic conductivity of the solid electrolyte of Sample 5a less than the value (FIG. 14) obtained by storing the solid electrolyte of Sample 1a in the environment at a low humidity of 0.0005% RH for 9 days.

(Sample 6a)

A solid electrolyte of Sample 6a was produced in the same manner as for Sample 1a, except that BMI-TFSI was used instead of BMP-TFSI and that the mixing ratio between TEOS, BMI-TFSI, and Li-TFSI was TEOS:BMI-TFSI:Li-TFSI=1.0:1.75:0.58 on a molar basis.

(Reference Sample 3)

An electrolyte solution containing only BMI-TFSI and Li-TFSI was prepared as an electrolyte of Reference Sample 3. The mixing ratio between BMI-TFSI and Li-TFSI was BMI-TFSI:Li-TFSI=3.0:1.0 on a molar basis.

(Sample 6b)

A solid electrolyte of Sample 6b was produced in the same manner as for Sample 1a, except that EMI-TFSI was used instead of BMP-TFSI and that the mixing ratio between TEOS, EMI-TFSI, and Li-TFSI was TEOS:EMI-TFSI:Li-TFSI=1.0:1.75:0.58 on a molar basis.

(Reference Sample 4)

An electrolyte solution containing only EMI-TFSI and Li-TFSI was prepared as an electrolyte of Reference Sample 4. The mixing ratio between EMI-TFSI and Li-TFSI was EMI-TFSI:Li-TFSI=3.0:1.0 on a molar basis.

(Sample 6c)

A solid electrolyte of Sample 6c was produced in the same manner as for Sample 1a, except that BMI-BETI and Li-BETI were used instead of BMP-TFSI and Li-TFSI and that the mixing ratio between TEOS, BMI-BETI, and Li-BETI was TEOS:BMI-BETI:Li-BETI=1.0:1.75:0.58 on a molar basis.

(Reference Sample 5)

An electrolyte solution containing only BMI-BETI and Li-BETI was prepared as an electrolyte of Reference Sample 5. The mixing ratio between BMI-BETI and Li-BETI was BMI-BETI:Li-BETI=3.0:1.0 on a molar basis.

(Sample 6d)

A solid electrolyte of Sample 6d was produced in the same manner as for Sample 1a, except that EMI-BETI and Li-BETI were used instead of BMP-TFSI and Li-TFSI and that the mixing ratio between TEOS, EMI-BETI, and Li-BETI was TEOS:EMI-BETI:Li-BETI=1.0:1.75:0.58 on a molar basis.

(Reference Sample 6)

An electrolyte solution containing only EMI-BETI and Li-BETI was prepared as an electrolyte of Reference Sample 6. The mixing ratio between EMI-BETI and Li-BETI was EMI-BETI:Li-BETI=3.0:1.0 on a molar basis.

(Sample 6e)

A solid electrolyte of Sample 6e was produced in the same manner as for Sample 1a, except that PYR15-TFSI was used instead of BMP-TFSI and that the mixing ratio between TEOS, PYR15-TFSI, and Li-TFSI was TEOS:PYR15-TFSI:Li-TFSI=1.0:1.75:0.58 on a molar basis.

(Reference Sample 7)

An electrolyte solution containing only PYR15-TFSI and Li-TFSI was prepared as an electrolyte of Reference Sample 7. The mixing ratio between PYR15-TFSI and Li-TFSI was PYR15-TFSI:Li-TFSI=3.0:1.0 on a molar basis.

(Sample 6f)

A solid electrolyte of Sample 6f was produced in the same manner as for Sample 1a, except that BMP-FAP was used instead of BMP-TFSI and that the mixing ratio between TEOS, BMP-FAP, and Li-TFSI was TEOS:BMP-FAP:Li-TFSI=1.0:1.75:0.58 on a molar basis.

(Reference Sample 8)

An electrolyte solution containing only BMP-FAP and Li-TFSI was prepared as an electrolyte of Reference Sample 8. The mixing ratio between BMP-FAP and Li-TFSI was BMP-FAP:Li-TFSI=3.0:1.0 on a molar basis.

The ionic conductivity at about 23 to 24° C. was measured for the solid electrolytes of Samples 6a to 6f and the electrolytes of Reference Samples 3 to 8 by the AC impedance method. The results are shown in Table 1.

TABLE 1

|  | Raw materials | | | Ionic conductivity (mS/cm) |
|---|---|---|---|---|
|  | Ionic liquid | Lithium salt | Others |  |
| Sample 6a | BMI-TFSI | Li-TFSI | TEOS, PGME, water | 1.8 |
| Reference Sample 3 | BMI-TFSI | Li-TFSI | — | 1.3 |
| Sample 6b | EMI-TFSI | Li-TFSI | TEOS, PGME, water | 3.0 |
| Reference Sample 4 | EMI-TFSI | Li-TFSI | — | 2.8 |
| Sample 6c | BMI-BETI | Li-BETI | TEOS, PGME, water | 1.8 |
| Reference Sample 5 | BMI-BETI | Li-BETI | — | 0.5 |
| Sample 6d | EMI-BETI | Li-BETI | TEOS, PGME, water | 1.7 |
| Reference Sample 6 | EMI-BETI | Li-BETI | — | 0.9 |
| Sample 6e | PYR15-TFSI | Li-TFSI | TEOS, PGME, water | 0.9 |
| Reference Sample 7 | PYR15-TFSI | Li-TFSI | — | 0.5 |
| Sample 6f | BMP-FAP | Li-TFSI | TEOS, PGME, water | 1.1 |
| Reference Sample 8 | BMP-FAP | Li-TFSI | — | 0.8 |

As shown in Table 1, the solid electrolytes produced using the ionic liquid, lithium salt, TEOS, PGME, and water exhibited ionic conductivities higher than those of the electrolyte solutions including only the ionic liquid and lithium salt, no matter which of the various combinations of the ionic liquid and lithium salt is employed. It is inferred from this result that the solid electrolytes of Samples 6a to 6f also have a surface adsorption layer which is same as or similar to that of the solid electrolyte of Sample 1a.

INDUSTRIAL APPLICABILITY

The techniques of the present disclosure are useful for power storage devices such as lithium-ion secondary batteries.

The invention claimed is:

1. A solid electrolyte, comprising:
a porous dielectric having a plurality of pores interconnected mutually;
an electrolyte comprising a metal salt and at least one selected from the group consisting of an ionic compound and a bipolar compound, the electrolyte at least partially filling an interior of each of the plurality of pores; and
a surface adsorption layer adsorbed on inner surfaces of the plurality of pores to induce polarization.

2. The solid electrolyte according to claim 1, wherein
the electrolyte comprises a polarization layer adsorbed on an inner surface of the surface adsorption layer,
the polarization layer comprises a first ion layer, a second ion layer, and a third ion layer,
the first ion layer is a layer comprising a plurality of first ions bonded to the surface adsorption layer,
the plurality of first ions each have a first polarity,
the second ion layer is a layer comprising a plurality of second ions bonded to the plurality of first ions,
the plurality of second ions each have a second polarity being a polarity opposite to the first polarity,
the third ion layer is a layer comprising a plurality of third ions bonded to the plurality of second ions, and
the plurality of third ions each have the first polarity.

3. The solid electrolyte according to claim 2, wherein
the plurality of first ions are each an anion derived from the ionic compound or the metal salt,
the plurality of second ions are each a cation derived from the ionic compound, and
the plurality of third ions are each an anion derived from the ionic compound or the metal salt.

4. The solid electrolyte according to claim 2, wherein the electrolyte further comprises a bulk layer located farther from the inner surface of the pore than the polarization layer.

5. The solid electrolyte according to claim 2, wherein the surface adsorption layer comprises water adsorbed on the inner surfaces of the plurality of pores.

6. The solid electrolyte according to claim 5, wherein the water forms 1 or more and 4 or less monolayers.

7. The solid electrolyte according to claim 2, wherein the surface adsorption layer comprises a polyether adsorbed on the inner surfaces of the plurality of pores.

8. The solid electrolyte according to claim 7, wherein the polyether comprises polyethylene glycol.

9. The solid electrolyte according to claim 8, wherein the polyethylene glycol has a number average molecular weight of 4000 or more and 100000 or less.

10. The solid electrolyte according to claim 8, wherein the polyethylene glycol has a viscosity average molecular weight of 100000 or more and 600000 or less.

11. The solid electrolyte according to claim 1, wherein the metal salt is a lithium salt.

12. The solid electrolyte according to claim 11, wherein the lithium salt comprises lithium bis(trifluoromethanesulfonyl)imide.

13. The solid electrolyte according to claim 1, wherein the ionic compound is an ionic liquid.

14. The solid electrolyte according to claim 13, wherein the ionic liquid comprises a bis(trifluoromethanesulfonyl)imide anion.

15. The solid electrolyte according to claim 14, wherein the ionic liquid comprises at least one selected from the group consisting of 1-butyl-1-methylpyrrolidinium bis(trifluoromethanesulfonyl)imide and triethylsulfonium bis(trifluoromethanesulfonyl)imide.

16. The solid electrolyte according to claim 1, wherein the porous dielectric is porous silica.

17. The solid electrolyte according to claim 1, wherein
the porous dielectric forms a single layer, and
an outer boundary of the solid electrolyte is defined by the porous dielectric.

18. An electrode, comprising:
the solid electrolyte according to claim 1; and
an electrode active material.

19. A power storage device, comprising:
a positive electrode;
a negative electrode; and
the solid electrolyte according to claim 1.

20. A power storage device, comprising:
a positive electrode; and
a negative electrode, wherein
at least one selected from the positive electrode and the negative electrode is the electrode according to claim 18.

* * * * *